(12) United States Patent
Barnes et al.

(10) Patent No.: US 10,000,688 B2
(45) Date of Patent: Jun. 19, 2018

(54) COMPOSITION AND METHOD FOR ENHANCED HYDROCARBON RECOVERY

(75) Inventors: Julian Richard Barnes, Amsterdam (NL); Hendrik Dirkzwager, Amsterdam (NL); Robert Moene, Amsterdam (NL); Reinaldo Conrado Navarrete, Houston, TX (US); Kirk Herbert Raney, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 780 days.

(21) Appl. No.: 14/119,221

(22) PCT Filed: May 25, 2012

(86) PCT No.: PCT/EP2012/059891
§ 371 (c)(1),
(2), (4) Date: Jun. 30, 2014

(87) PCT Pub. No.: WO2012/163852
PCT Pub. Date: Dec. 6, 2012

(65) Prior Publication Data
US 2014/0367096 A1 Dec. 18, 2014

(30) Foreign Application Priority Data
May 27, 2011 (EP) .................................... 11167867

(51) Int. Cl.
*C09K 8/584* (2006.01)
*C09K 8/588* (2006.01)
*E21B 43/16* (2006.01)

(52) U.S. Cl.
CPC .............. *C09K 8/584* (2013.01); *C09K 8/588* (2013.01); *E21B 43/16* (2013.01)

(58) Field of Classification Search
CPC .......... C09K 8/584; C09K 8/588; E21B 43/16
See application file for complete search history.

(56) References Cited

U.S. PATENT DOCUMENTS

| | | | |
|---|---|---|---|
| 3,943,160 A | 3/1976 | Farmer, III et al. | |
| 3,946,812 A | 3/1976 | Gale et al. | |
| 4,029,608 A | 6/1977 | Murata et al. | |
| 4,077,471 A | 3/1978 | Shupe et al. | |
| 4,183,867 A | 1/1980 | Sekiguchi et al. | |
| 4,216,079 A | 8/1980 | Newcombe | |
| 4,248,793 A | 2/1981 | Sekiguchi et al. | |
| 4,597,879 A | 7/1986 | Morita et al. | |
| 4,822,501 A | 4/1989 | Debons et al. | |
| 4,979,564 A | 12/1990 | Kalpakci et al. | |
| 5,068,043 A | 11/1991 | Thigpen et al. | |
| 5,076,363 A * | 12/1991 | Kalpakci | C09K 8/584 166/270.1 |
| 5,103,909 A | 4/1992 | Morgenthaler et al. | |
| 5,108,646 A | 4/1992 | Beerse et al. | |
| 5,114,599 A | 5/1992 | Debons et al. | |
| 5,199,490 A | 4/1993 | Surles et al. | |
| 5,284,206 A | 2/1994 | Surles et al. | |
| 5,318,709 A | 6/1994 | Wuest et al. | |
| 5,510,306 A | 4/1996 | Murray | |
| 5,633,422 A | 5/1997 | Murray | |
| 5,648,584 A | 7/1997 | Murray | |
| 5,648,585 A | 7/1997 | Murray | |
| 5,654,261 A | 8/1997 | Smith | |
| 5,723,423 A | 3/1998 | Van Slyke | |
| 5,849,960 A | 12/1998 | Singleton et al. | |
| 6,022,834 A | 2/2000 | Hsu et al. | |
| 6,269,881 B1 | 8/2001 | Chou et al. | |
| 6,427,268 B1 | 8/2002 | Davis | |
| 6,439,308 B1 | 8/2002 | Wang | |
| 2009/0163669 A1 | 6/2009 | Sinquin et al. | |
| 2010/0282467 A1* | 11/2010 | Hutchison | C07C 303/06 166/305.1 |
| 2010/0324325 A1 | 12/2010 | Goda et al. | |
| 2011/0000987 A1 | 1/2011 | Fujioka et al. | |
| 2011/0166374 A1 | 7/2011 | Fujioka et al. | |

FOREIGN PATENT DOCUMENTS

| | | |
|---|---|---|
| CN | 101743300 | 11/2011 |
| EP | 0351928 | 1/1990 |
| EP | 377261 | 7/1990 |
| EP | 0482687 | 4/1992 |
| EP | 830315 | 9/1999 |
| EP | 2261298 | 12/2010 |
| WO | 9640587 | 12/1996 |
| WO | 2004081342 | 9/2004 |
| WO | 2006029676 | 3/2006 |

OTHER PUBLICATIONS

Barnes, Julian R., et al.; Application of Internal Olefin Sulfonates and Other Surfactants to EOR. Part 1: Structure-Performance Relationships for Selection at Different Reservoir Conditions, SPE 129766, pp. 1-16, 2010.

(Continued)

*Primary Examiner* — Alicia Bland

(57) ABSTRACT

The invention relates to a hydrocarbon recovery composition comprising an anionic surfactant, wherein said composition is in the solid state, and to a shaped article comprising said composition. Preferably, said composition is in the form of a powder. Further, the invention relates to a process for treating a hydrocarbon containing formation comprising the steps of a) transporting said composition or shaped article to the location of the hydrocarbon containing formation; b) dissolving said composition or shaped article in water thereby forming an aqueous fluid containing the hydrocarbon recovery composition; c) providing the aqueous fluid containing the hydrocarbon recovery composition to at least a portion of the hydrocarbon containing formation; and d) allowing the hydrocarbon recovery composition to interact with the hydrocarbons in the hydrocarbon containing formation.

1 Claim, 4 Drawing Sheets

(56) References Cited

OTHER PUBLICATIONS

Chatzis et al; "Correlation of capillary number relationship for sandstone" SPE Journal; vol. 29; pp. 555-562; 1989.
Wellington et al; "Low Surfactant Concentration Enhanced Waterflooding"; Society of Petroleum Engineers; 1995.
Levitt et al; Identification and Evaluation of High Performance EOR Surfatants; Society of Petroleum Engineers; pp. 1-11; 2006.
Falls et al; "Field Test of Cosurfactant-enhanced Alkaline Flooding"; Society of Petroleum Engineers Reservoir Engineering; 1994.
Adami; "Production of llinear alkylbenzene sulphonate and alpha-olefin sulphonates"; Surfactant Science Series; vol. 142, Chapter 5; p. 83.
Stacke H.W.; "Anionic Surfactants: Organic Chemistry"; Surfactant Science Series; vol. 56, Chapter 7 Olefin Sulfonates; p. 363; 1996.
Rashidi et al; "Viscosity Study of Salt Tolerant Polymers"; Journal of Applied Polymer Science; vol. 117; pp. 1551-1557; 2010.
Showell M.S.; "Powdered Detergents" Surfactant Science Series; vol. 71; Chapter 2; pp. 21-42 1998.
Liu et al; "Favorable Attributes of Alkaline-Surfactant-Polymer Flooding"; SPE Journal; pp. 5-16; Mar. 2008.

\* cited by examiner

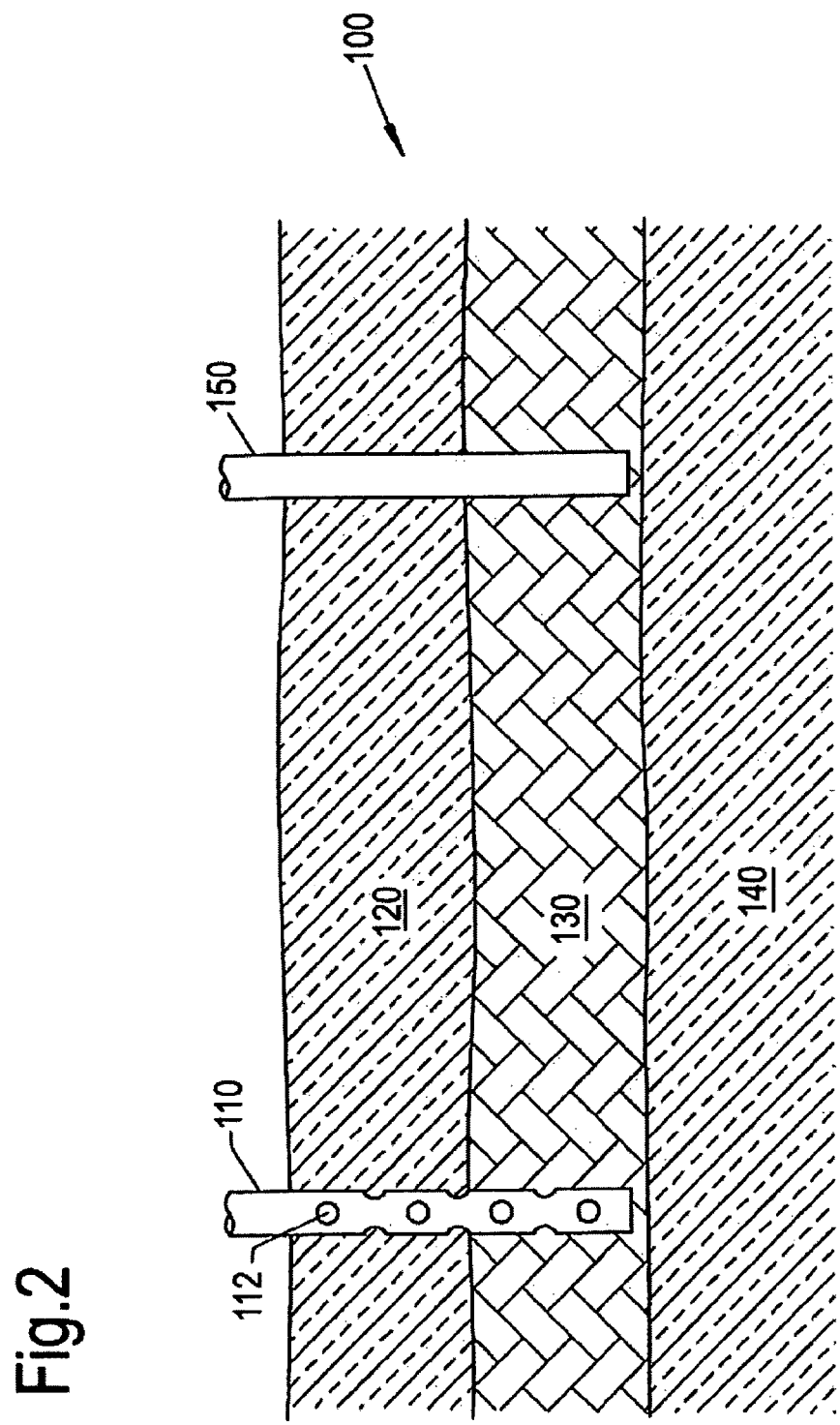

COMPOSITION AND METHOD FOR ENHANCED HYDROCARBON RECOVERY

PRIORITY CLAIM

The present application is a National Stage (§ 371) application of International Application No. PCT/EP2012/059891, filed 25 May 2012, which claims the benefit of European Application No. 11167867.8, filed 27 May 2011, the disclosures of which are incorporated herein by reference.

BACKGROUND TO THE INVENTIONS

The present invention relates to a hydrocarbon recovery composition comprising an anionic surfactant and to a process for treating a hydrocarbon containing formation using said hydrocarbon recovery composition.

Hydrocarbons, such as oil, may be recovered from hydrocarbon containing formations (or reservoirs) by penetrating the formation with one or more wells, which may allow the hydrocarbons to flow to the surface. A hydrocarbon containing formation may have a natural energy source (for example gas, water) to aid in mobilising hydrocarbons to the surface of the wells. For example, water or gas may be present in the formation at sufficient levels to exert pressure on the hydrocarbons to mobilise them to the surface of the production wells. However, reservoir conditions (for example permeability, hydrocarbon concentration, porosity, temperature, pressure) can significantly impact the economic viability of hydrocarbon production from any particular hydrocarbon containing formation. Furthermore, any natural energy sources that exist may become depleted over time, often long before the majority of hydrocarbons have been extracted from the reservoir. Therefore, supplemental recovery processes may be required and used to continue the recovery of hydrocarbons from the hydrocarbon containing formation. Examples of known supplemental processes include waterflooding, polymer flooding, gas flooding, alkali flooding, thermal processes, solution flooding or combinations thereof.

In recent years there has been increased activity in developing new and improved methods of chemical Enhanced Oil Recovery (cEOR) for maximising the yield of hydrocarbons from a subterranean reservoir. In surfactant cEOR the mobilisation of residual oil saturation is achieved through surfactants which generate a sufficiently (ultra) low crude oil/water interfacial tension (IFT) to give a capillary number large enough to overcome capillary forces and allow the oil to flow (Chatzis & Morrows, "Correlation of capillary number relationship for sandstone", SPE Journal, volume 29, pages 555-562, 1989). However, different reservoirs can have very different characteristics (for example crude oil type, temperature, water composition—salinity, hardness etc.), and therefore, it is desirable that the structures and properties of the added surfactant(s) be matched to the particular conditions of a reservoir to achieve the required low IFT. In addition, other important criteria must be fulfilled, such as low rock retention or adsorption, compatibility with polymer, thermal and hydrolytic stability and acceptable cost (including ease of commercial scale manufacture).

Compositions and methods for cEOR are described in U.S. Pat. No. 3,943,160, U.S. Pat. No. 3,946,812, U.S. Pat. No. 4,077,471, U.S. Pat. No. 4,216,079, U.S. Pat. No. 5,318,709, U.S. Pat. No. 5,723,423, U.S. Pat. No. 6,022,834, U.S. Pat. No. 6,269,881, "Low Surfactant Concentration Enhanced Waterflooding", Wellington et al., Society of Petroleum Engineers, 1995, and "Identification and Evaluation of High Performance EOR Surfactants", Levitt et al., SPE 100089, 2006, pages 1-11.

Compositions and methods for cEOR utilising an internal olefin sulfonate (IOS) as surfactant are described in U.S. Pat. No. 4,597,879, U.S. Pat. No. 4,979,564, U.S. Pat. No. 5,068,043 and "Field Test of Cosurfactant-enhanced Alkaline Flooding", Falls et al., Society of Petroleum Engineers Reservoir Engineering, 1994.

In addition to a surfactant, the main function of which is to lower the IFT, a hydrocarbon recovery composition may comprise an alkaline agent and/or a polymer. The main function of the alkaline agent is to lower rock retention or adsorption. The main function of the polymer is to increase viscosity. Generally, at the hydrocarbon recovery location, separate storage facilities are used for storing surfactant, alkaline agent and polymer and separate make-up facilities are used for making a surfactant containing solution, an alkaline agent containing solution and a polymer containing solution, after which these must be blended together before providing to the hydrocarbon containing formation. Savings can be accomplished if a hydrocarbon recovery composition is in such a form that it can easily be transported to the hydrocarbon recovery location and then easily stored at that location (for example on an off-shore platform storage capacity is relatively small), and further that at the hydrocarbon recovery location limited equipment is needed to produce the fluid that is provided to the hydrocarbon containing formation.

Surfactants for enhanced hydrocarbon recovery are normally provided to the hydrocarbon containing formation by admixing it with water and/or brine which may originate from the formation from which hydrocarbons are to be recovered, thereby forming a fluid that can be injected into the hydrocarbon containing formation. The surfactant amount in such injectable water containing fluid is generally in the range of from 0.1 to 1 wt. %. See for example "Favorable Attributes of Alkaline-Surfactant-Polymer Flooding", Liu et al., SPE Journal, March 2008, pages 5-16.

Surfactants for enhanced hydrocarbon recovery are normally synthesised at a location which is far remote from the location where hydrocarbons are to be recovered from a hydrocarbon containing formation. This means that the surfactants have to be transported to that hydrocarbon recovery location. Such transport involves high costs. It is desirable to find a way which substantially reduces these costs other than by synthesising the surfactants at the hydrocarbon recovery location itself. The latter option is not cost efficient because in such case there would still be transport involved for surfactants to be provided to other hydrocarbon recovery locations. EP2261298A discloses the formation of a hydrocarbon recovery composition at the hydrocarbon recovery location.

Normally, surfactants for enhanced hydrocarbon recovery are transported to a hydrocarbon recovery location and stored at that location in the form of an aqueous solution containing for example 30 to 35 wt. % of the surfactant. At the hydrocarbon recovery location, such solution would then be further diluted to a 0.1-1 wt. % solution as referred to above, before it is injected into a hydrocarbon containing formation. In practice, it is not preferred to transport and store more concentrated (for example 60-80 wt. % instead of said 30-35 wt. %) surfactant containing aqueous mixtures because such mixtures are generally highly viscous and therefore difficult to handle in said transport, storage and dilution.

Having to transport such 30-35 wt. % surfactant containing aqueous solutions thus still involves the transport of substantial volumes of water to hydrocarbon recovery locations which may be very remote from the location where the surfactants were synthesised and/or which hydrocarbon recovery locations may not be easily accessible. Likewise, the storage capacity at those hydrocarbon recovery locations should be large enough to accommodate such substantial volumes of water. Further, it is important that surfactants for enhanced hydrocarbon recovery are injected into a hydrocarbon containing formation as part of a single-phase solution, because formation of precipitate, liquid crystal or a second liquid phase can lead to non-uniform distribution of injected material and non-uniform transport owing to phase trapping or different mobilities of coexisting phases. This means that a homogeneous, solid-free surfactant containing solution should be obtained.

Therefore, it is desired to find a way which substantially reduces costs for transporting and storing surfactants for enhanced hydrocarbon recovery, while at the same time such surfactants can still be provided to a hydrocarbon containing formation as part of a single-phase solution.

SUMMARY OF THE INVENTION

Surprisingly it was found that surfactants for cEOR do not have to be transported to hydrocarbon recovery locations and stored at those locations in the form of aqueous solutions, but can be transported thereto and stored as a solid. Since the transport and storage of surfactant containing solids involves significantly smaller volumes of material, as compared to the transport and storage of aqueous solutions containing surfactant, an enormous cost reduction is achieved by the present invention.

In addition, it was surprisingly found that such surfactant containing solids can still be converted, upon mixing with water, into single-phase solutions which are suitable for injection into a hydrocarbon containing formation at the hydrocarbon recovery location.

Still further, it was surprisingly found that the dissolution rate for making an aqueous fluid that is suitable for injection into a hydrocarbon containing formation at the hydrocarbon recovery location, is improved by the use of a solid which comprises surfactant and in addition alkaline agent and/or polymer. It was found that dissolving a solid comprising surfactant, alkaline agent and polymer took less time than dissolving said same polymer separately. In addition, by already including the polymer in the solid comprising the surfactant there is no need for the additional step of mixing a polymer containing solution with the surfactant containing solution at the hydrocarbon recovery location before injection into the hydrocarbon containing formation.

Still further, by already including the polymer in the solid comprising the surfactant, the so-called "fisheyes" phenomenon that may occur in dissolving polymer in water is advantageously prevented completely. It is generally known that dissolving a polymer in water is a cumbersome process, and that special means are needed to avoid intermediate viscous phases, such as said "fisheyes". For example, in "Viscosity Study of Salt Tolerant Polymers", Rashidi et al., Journal of Applied Polymer Science, volume 117, pages 1551-1557, 2010, it is disclosed that in making polymer containing aqueous NaCl solutions on a labscale, the polymer powder should be slowly introduced into the side of the vortex (relatively strong vortex of 720 rpm) to avoid formation of said "fisheyes" which can be formed if the powder is not wetted evenly. On an industrial scale, measures that have to be taken to avoid formation of said "fisheyes" are even more radical. In order to obtain a finely divided polymer powder in the solution and thereby to prevent formation of said "fisheyes", it is common industrial practice to use additional equipment, such as so-called "slicing units" which are used with the sole purpose of first obtaining such finely divided polymer powder. Polymer Slicing Units can be obtained from SNF Floerger and have to be used to dissolve polymer powder in huge quantity (for example 300 kilogram per hour), thereby saving time by reduction of the next dissolution stage prior to injection of the polymer into a hydrocarbon containing formation.

Accordingly, the present invention relates to a hydrocarbon recovery composition comprising an anionic surfactant, wherein the hydrocarbon recovery composition is in the solid state.

Within the present specification, the term "hydrocarbon recovery composition" implies that the composition is suitable for hydrocarbon recovery. The composition is suitable for hydrocarbon recovery because it comprises a surfactant, more in particular an anionic surfactant. That is to say, the present invention relates to a composition comprising an anionic surfactant, wherein the composition is in the solid state. And this composition is suitable for hydrocarbon recovery. Therefore, it is referred to as "hydrocarbon recovery composition".

BRIEF DESCRIPTION OF THE DRAWINGS

FIG. 2 schematically illustrates providing a hydrocarbon recovery composition to a hydrocarbon containing formation.

DETAILED DESCRIPTION OF THE INVENTION

Figure 1A:
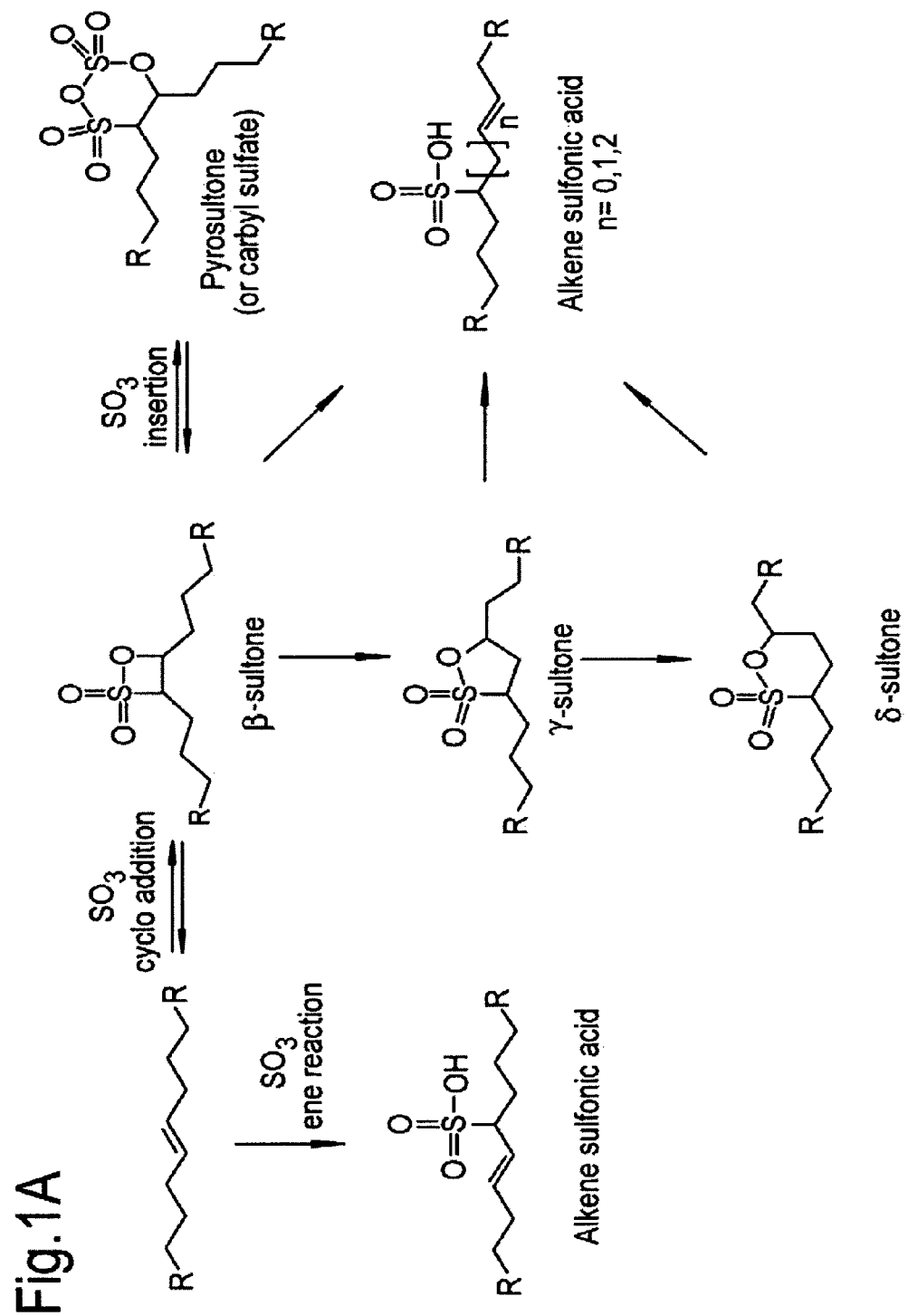
FIG. 1A illustrates the reactions of an internal olefin with sulfur trioxide during the sulfonation process.

In the present invention, the hydrocarbon recovery composition should be in the solid state. By "solid state" reference is made to the state of the hydrocarbon recovery composition under conditions of a temperature of 20° C. and atmospheric pressure.

Suitably, in the present invention, the hydrocarbon recovery composition contains either no water or only a limited amount of water, suitably an amount of water which is at most 10 wt. %, more suitably at most 8 wt. %, more suitably at most 6 wt. %, more suitably at most 5 wt. %, more suitably at most 4 wt. %, more suitably at most 3.5 wt. %, more suitably at most 3 wt. %, more suitably at most 2.5 wt. %, more suitably at most 2 wt. %, more suitably at most 1.5 wt. %, most suitably at most 1 wt. %. Said water comprises any type of water, including free water, adsorbed water and crystallisation water.

Thus, in the present invention, the hydrocarbon recovery composition is a solid which comprises an anionic surfactant. In EP0482687A1, a concentrated liquid, pourable composition is disclosed which comprises an internal olefin sulphonate (IOS) surfactant and water. The composition of EP0482687A1 is described as being easily storageable, handlable and transportable. Furthermore, it is described that it may be easily spray-dried or converted into a less concentrated composition. EP0482687A1 does not mention any application for cEOR.

EP377261A2 also discloses compositions comprising an IOS as anionic surfactant. The composition may be a granular laundry detergent or a liquid laundry detergent. Further, it may contain a builder, such as sodium carbonate. Examples 1-7 of EP377261A2 disclose granular compositions wherein the water proportion would be 31 wt. %. Further, there is mention in EP377261A2 of antigreying agents, which may be water soluble polyanionic polymers such as polymers and copolymers of acrylic and maleic acid, and cellulose derivatives. In EP377261A2, there is neither any reference to an application for cEOR.

Surfactant

In the present invention, the hydrocarbon recovery composition comprises one or more anionic surfactants. In addition to the anionic surfactant, the hydrocarbon recovery composition of the present invention may also comprise a non-ionic surfactant.

"Surfactant" is the shortened term for "surface-active agent", which comprises a chemical that stabilises mixtures of oil and water by reducing the interfacial tension at the interface between the oil and water molecules. Because water and oil hardly dissolve in each other, a surfactant may be added to the mixture to keep it from separating into layers. Any surfactant comprises a hydrophilic part and a hydrophobic part. When the hydrophilic part of a surfactant comprises a negatively charged group like a sulphonate, sulphate or carboxylate, the surfactant is called anionic. Further, an anionic surfactant comprises a counter cation to compensate for this negative charge.

That is to say, generally, an anionic surfactant has the following formula (I)

$$[S^{m-}][M^{n+}]_o \quad (I)$$

wherein S is the negatively charged portion of the anionic surfactant, M is a counter cation and the product of n and o (n*o) equals m. Said negatively charged portion S thus comprises (i) the hydrophilic part, which comprises a negatively charged group, and (ii) the hydrophobic part of the anionic surfactant.

Within the present specification, the anionic surfactant in the hydrocarbon recovery composition of the present invention may be characterised by its carbon number, number of branches and/or molecular weight. In case reference is made to an average carbon number, average number of branches and/or average molecular weight, this means that the anionic surfactant in question is a mixture of surfactant molecules with differ from each other in terms of carbon number, number of branches and/or molecular weight.

Within the present specification, said average carbon number is determined by multiplying the number of carbon atoms of each surfactant molecule or group within each surfactant molecule by the weight fraction of that molecule or group and then adding the products, resulting in a weight average carbon number. The average carbon number may be determined by NMR analysis.

Within the present specification, said average number of branches is determined by multiplying the number of branches of each surfactant molecule or group within each surfactant molecule by the weight fraction of that molecule or group and then adding the products, resulting in a weight average number of branches. The average number of branches may be determined by NMR analysis. Said average number of branches also takes into account unbranched molecules or groups in addition to branched molecules or groups.

Further, within the present specification, if a mixture of surfactant molecules or groups within the surfactant molecules is branched, this means that the majority, that is to say more than 50 wt. %, has at least one branch. That is to say, in such case, the weight ratio of linear to branched for said mixture is smaller than 1:1.

Within the present specification, said average molecular weight is determined by multiplying the molecular weight of each surfactant molecule by the weight fraction of that molecule and then adding the products, resulting in a weight average molecular weight.

The anionic surfactant in the hydrocarbon recovery composition of the present invention may be any one of the anionic surfactants, or a mixture of such surfactants, that are known to effect recovery of hydrocarbons from hydrocarbon containing formations. Suitable anionic surfactants for hydrocarbon recovery are described in the patent references and non-patent literature references as listed in the introductory part of this specification, describing compositions and methods for enhanced hydrocarbon recovery, the disclosures of all of which references are incorporated herein by reference.

Preferably, the anionic surfactant in the hydrocarbon recovery composition of the present invention is selected from the group consisting of:
a) an internal olefin sulfonate (IOS);
b) an anionic surfactant based on an alkoxylated or non-alkoxylated alcohol having an aliphatic group;
c) an alpha-olefin sulfonate (AOS);
d) a linear alkyl benzene sulfonate (LABS);
e) a branched alkyl benzene sulfonate (BABS); and
f) any mixture of the foregoing anionic surfactants.

More preferably, the anionic surfactant in the hydrocarbon recovery composition of the present invention is selected from the group consisting of a surfactant as mentioned under a) above, a surfactant as mentioned under b) above, a surfactant as mentioned under c) above or any mixture of said surfactants.

Even more preferably, the anionic surfactant in the hydrocarbon recovery composition of the present invention is selected from the group consisting of a surfactant as mentioned under a) above, a surfactant as mentioned under b) above or any mixture of said surfactants.

In a particularly preferred embodiment of the present invention, the anionic surfactant in the hydrocarbon recovery composition is an internal olefin sulfonate (IOS), as mentioned under a) above and as further described below.

An example of a suitable linear alkyl benzene sulfonate (LABS), as mentioned under d) above, is sodium dodecyl benzene sulfonate. In a LABS, a predominantly linear (for example $C_{10}$-$C_{13}$) alkyl group is attached, either via its terminal carbon atom or an internal carbon atom, to a benzene molecule which benzene molecule is also substituted with a sulfonate group on another position, preferably at the para position, and which benzene molecule may be further substituted at the remaining positions, for example with alkyl groups, such as a methyl group. Examples of suitable LABS that can be used as anionic surfactant in the present invention are disclosed in US20090163669. US20090163669 describes tri-alkyl substituted benzene sulfonates, such as the sulfonates of the alkylation product of ortho-xylene with a mixture of $C_{12}$-$C_{30}^+$ linear alpha-olefins.

In the present invention, the anionic surfactant mentioned above under b), may be an anionic surfactant based on an alkoxylated or non-alkoxylated, preferably alkoxylated, alcohol having an aliphatic group, which group has an average carbon number of from 8 to 26 and an average number of branches of from 0.5 to 2.5, and having an average of at least 0.5 mole of alkylene oxide groups per mole of alcohol if the alcohol is alkoxylated. Said alcohol may be primary or secondary, preferably primary. Said anionic surfactant may be of the following formula (II)

[R—O—[R'—O]$_x$-A$^{m-}$][M$^{n+}$]$_o$ (II)

wherein R is the aliphatic group originating from the alcohol, R'—O is an alkylene oxide group originating from the alkylene oxide, x is 0 or at least 0.5, preferably at least 0.5, A is a negatively charged group, M is a counter cation and the product of n and o (n*o) equals m.

In above exemplary formula (II), m and n are integers. m may be 1, 2 or 3. Further, o may be any number which ensures that the anionic surfactant is electrically neutral. That is to say, the product of n and o (n*o) should equal m. o may be a number in the range of from 0.5 to 3.

The counter cation, denoted as M$^{m+}$ in above exemplary formula (II), may be an organic cation, such as a nitrogen containing cation, for example an ammonium cation which may be unsubstituted or substituted. Further, the counter cation may be a metal cation, such as an alkali metal cation or an alkaline earth metal cation. Preferably, such alkali metal cation is lithium cation, sodium cation or potassium cation. Further, preferably, such alkaline earth metal cation is magnesium cation or calcium cation.

The alkylene oxide groups in above exemplary formula (II) may comprise any alkylene oxide groups. For example, said alkylene oxide groups may comprise ethylene oxide groups, propylene oxide groups and butylene oxide groups or a mixture thereof, such as a mixture of ethylene oxide and propylene oxide groups. In case of a mixture of ethylene oxide and propylene oxide groups, the mixture may be random or blockwise.

The negatively charged group, denoted as A$^{m-}$ in above exemplary formula (II), may be any negatively charged group. Said negatively charged group is preferably a group comprising the —SO$_3^-$ moiety (either sulfate or sulfonate). Further, said negatively charged group may be a group comprising the —C(=O)O$^-$ moiety (carboxylate).

As mentioned above, preferably, the anionic surfactant in the hydrocarbon recovery composition of the present invention is an internal olefin sulfonate (IOS). An IOS comprises a mixture of IOS molecules. That is to say, within the present specification, "IOS" or "internal olefin sulfonate" as such refers to a mixture of IOS molecules whereas "IOS molecule" or "internal olefin sulfonate molecule" refers to one of the components from such IOS.

In the present invention, the average carbon number for the IOS is not essential and may vary within wide ranges, such as from 5 to 40, suitably 10 to 35, more suitably 15 to 30.

Further, in the present invention, the average number of branches for the IOS is neither essential and may also vary within wide ranges. Suitably, said average number of branches is at least 0.6, more suitably from 0.6 to 3.0, more suitably from 0.6 to 2.8, most suitably from 0.7 to 2.6.

The olefins used in making said IOS may thus be branched and/or unbranched. Therefore, the resulting IOS may be branched. The IOS may be partially or completely branched or the IOS may be partially or completely unbranched (that is to say linear, containing no branch).

Suitably, in the present invention, the IOS is highly branched or highly unbranched. For example, at least 70 wt. %, or at least 75 wt. %, or at least 80 wt. %, or at least 85 wt. % of the IOS molecules from the IOS is unbranched.

Still further, in the present invention, the average molecular weight for the IOS is neither essential and may also vary within wide ranges, such as from 100 to 500, suitably 150 to 450, more suitably 200 to 400 g/mole.

IOS suitable for use in the present invention include those from the ENORDET™ 0 series of surfactants commercially available from Shell Chemicals Company. IOS suitable for use in the present invention include one or more IOS selected from the group consisting of C$_{15-18}$ IOS, C$_{19-23}$ IOS, C$_{20-24}$ IOS and C$_{24-28}$ IOS, as further described below.

"C$_{15-18}$ internal olefin sulfonate" (C$_{15-18}$ IOS) as used herein means a mixture of internal olefin sulfonate molecules wherein the mixture has an average carbon number of from 16 to 17 and at least 50% by weight, preferably at least 65% by weight, more preferably at least 75% by weight, most preferably at least 90% by weight, of the internal olefin sulfonate molecules in the mixture contain from 15 to 18 carbon atoms.

"C$_{19-23}$ internal olefin sulfonate" (C$_{19-23}$ IOS) as used herein means a mixture of internal olefin sulfonate molecules wherein the mixture has an average carbon number of from 21 to 23 and at least 50% by weight, preferably at least 60% by weight, of the internal olefin sulfonate molecules in the mixture contain from 19 to 23 carbon atoms.

"C$_{20-24}$ internal olefin sulfonate" (C$_{20-24}$ IOS) as used herein means a mixture of internal olefin sulfonate molecules wherein the mixture has an average carbon number of from 20 to 23 and at least 50% by weight, preferably at least 65% by weight, more preferably at least 75% by weight, most preferably at least 90% by weight, of the internal olefin sulfonate molecules in the mixture contain from 20 to 24 carbon atoms.

"C$_{24-28}$ internal olefin sulfonate" (C$_{24-28}$ IOS) as used herein means a blend of internal olefin sulfonate molecules wherein the blend has an average carbon number of from 24.5 to 27 and at least 40% by weight, preferably at least 45% by weight, of the internal olefin sulfonate molecules in the blend contain from 24 to 28 carbon atoms.

Figure 1B:
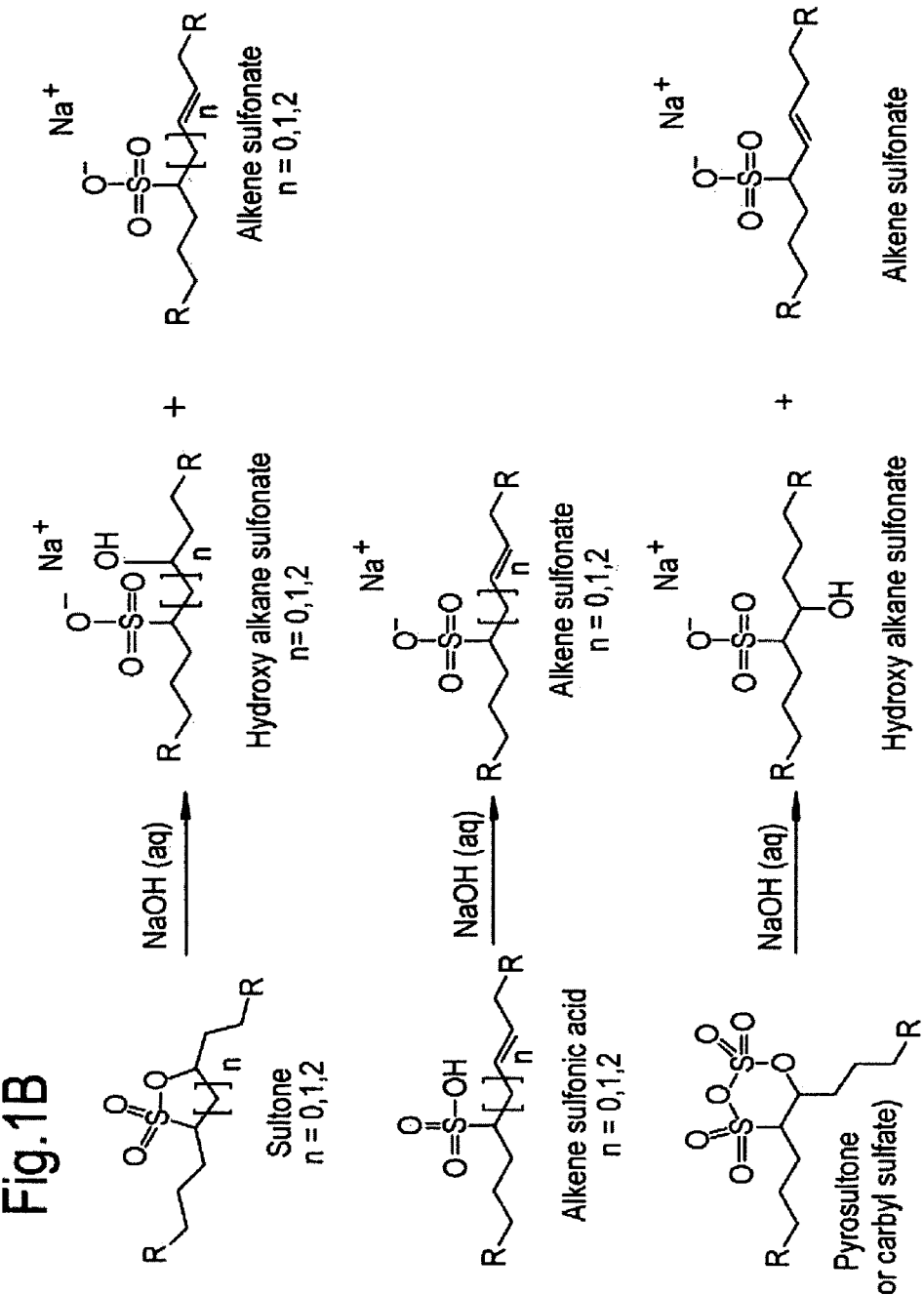
FIG. 1B illustrates the subsequent neutralisation and hydrolysis process to form an internal olefin sulfonate.

IOS manufacture comprises (a) sulfonation and (b) neutralisation and hydrolysis (Adami, "Production of linear alkylbenzene sulphonate and alpha-olefin sulphonates", Surfactant Science Series, volume 142, chapter 5, page 83). FIG. 1A illustrates the reactions of an internal olefin with sulfur trioxide during the sulfonation process. FIG. 1B illustrates the subsequent neutralisation and hydrolysis process to form an internal olefin sulfonate.

An IOS comprises a range of different molecules, which may differ from one another in terms of carbon number, number of branches and number and distribution of functional groups such as sulfonate and hydroxyl groups. An IOS comprises both hydroxyalkane sulfonate molecules and alkene sulfonate molecules and possibly also di-sulfonate molecules. Hydroxyalkane sulfonate molecules and alkene sulfonate molecules are shown in FIG. 1B. Di-sulfonate molecules (not shown in FIG. 1B) originate from a further sulfonation of for example an alkene sulfonic acid as shown in FIG. 1A.

The IOS, if present in the hydrocarbon recovery composition of the present invention, may comprise at least 30% hydroxyalkane sulfonate molecules, up to 70% alkene sulfonate molecules and up to 10% di-sulfonate molecules. Suitably, the IOS comprises from 30% to 90% hydroxyalkane sulfonate molecules, from 10% to 70% alkene sulfonate molecules and from 0% to 10% di-sulfonate molecules. Beneficially, the IOS comprises from 40% to 85% hydroxyalkane sulfonate molecules, from 15% to 60% alkene sulfonate molecules and from less than 1% to 5% di-sulfonate molecules. The composition of the IOS may be measured using a liquid chromatography/mass spectrometry (LC-MS) technique.

An IOS molecule is made from an internal olefin molecule whose double bond is located anywhere along the carbon chain except at a terminal carbon atom. Internal olefin molecules may be made by double bond isomerisation of alpha-olefin molecules whose double bond is located at a terminal position. Generally, such isomerisation results in a mixture of internal olefin molecules whose double bonds are located at different internal positions. The mixture that results from such preparation may also comprise a minor amount of alpha-olefins, for example up to 5%, suitably up to 3%.

Suitable processes for making internal olefins include those described in U.S. Pat. No. 5,510,306, U.S. Pat. No. 5,633,422, U.S. Pat. No. 5,648,584, U.S. Pat. No. 5,648,585, U.S. Pat. No. 5,849,960, EP0830315B1 and "Anionic Surfactants: Organic Chemistry", Surfactant Science Series, volume 56, Chapter 7, Marcel Dekker, Inc., New York, 1996, ed. H. W. Stacke, the disclosures of all of which are incorporated herein by reference.

In sulfonation, a sulfonating agent is reacted with internal olefins leading to the formation of cyclic intermediates known as beta-sultones, which can undergo isomerisation to unsaturated sulfonic acids and the more stable gamma- and delta-sultones. The mole ratio of sulfonating agent to internal olefin may be 1:1 to 1.6:1. The sulfonating agent may be sulfur trioxide, sulfuric acid, or oleum.

Sulfur trioxide is preferably diluted with a stream of nitrogen, air or any other inert gas into the reactor. The concentration of sulfur trioxide generally is between 2 and 5 percent by volume based on the volume of the carrier gas. The sulfonation reaction with $SO_3$ is preferably carried out in a film reactor, for example a "falling film reactor", where the olefin feed is continuously fed onto the inside surfaces of a tube and gaseous $SO_3$ is fed into the tube to react with the (falling) olefin film in a controlled manner. The reactor is cooled with a cooling means, which is preferably water, having a temperature preferably not exceeding 90° C., especially a temperature in the range of from 20 to 50° C., for example by flowing the cooling means at the outside walls of the reactor.

The sulfonation process may be carried out batchwise, semi-continuously or continuously. Preferably, the obtained reaction product is directly, without extracting the unreacted internal olefin, subjected to neutralisation and hydrolysis using a neutralisation agent. Said neutralisation agent may be a water soluble base, which is preferably selected from the group consisting of hydroxides, carbonates and bicarbonates of an (earth) alkali metal ion, such as sodium or potassium, or of ammonium ion, and amine compounds. Suitable examples are sodium hydroxide and sodium carbonate. The neutralisation is generally carried out with excessive base, calculated on the acid component.

Depending on the circumstances, part of the beta-sultones may be first converted into gamma-sultones which in turn may be converted into delta-sultones. Upon neutralisation and hydrolysis, beta-sultones give beta-hydroxyalkane sulfonates, whereas said gamma- and delta-sultones give gamma-hydroxyalkane sulfonates and delta-hydroxyalkane sulfonates, respectively. Part of said hydroxyalkane sulfonates may be dehydrated into alkene sulfonates.

The sulfonation reaction mixture may be fed to a neutralisation unit and then to a separate hydrolysis unit. Generally, neutralisation in the neutralisation unit is carried out at a temperature in the range of from 0 to 80° C. Hydrolysis in the hydrolysis unit may be carried out at an elevated temperature in the range of from 100 to 250° C., preferably 130 to 200° C. The hydrolysis time generally may be from 5 minutes to 4 hours.

During neutralisation and hydrolysis, a non-ionic surfactant may be added as a process aid.

U.S. Pat. No. 4,183,867, U.S. Pat. No. 4,248,793 and EP0351928B1, the disclosures of all of which are incorporated herein by reference, disclose processes which can be used to make the internal olefin sulfonates that can be used in the present invention as the anionic surfactant. Further, internal olefin sulfonates may be synthesised in a way as described by Van Os et al. in "Anionic Surfactants: Organic Chemistry", Surfactant Science Series 56, ed. Stacke H. W., 1996, Chapter 7: Olefin sulfonates, page 363, the disclosure of which is incorporated herein by reference.

Powder

In the present invention, the hydrocarbon recovery composition is a solid. Preferably, the hydrocarbon recovery composition is in the form of a powder. The present invention also relates to a hydrocarbon recovery composition comprising an anionic surfactant, as described above, wherein the hydrocarbon recovery composition is in the form of a powder.

Preferably, within the present specification, a "powder" concerns material that is composed of solid particles that are not cemented together. Preferably, the (solid) particles of a powder are free-flowing.

Suitably, in the present invention, the hydrocarbon recovery composition, when it is in the form of a powder, contains either no water or only a limited amount of water, suitably an amount of water which is at most 10 wt. %, more suitably at most 8 wt. %, more suitably at most 6 wt. %, more suitably at most 5 wt. %, more suitably at most 4 wt. %, more suitably at most 3.5 wt. %, more suitably at most 3 wt. %, more suitably at most 2.5 wt. %, more suitably at most 2 wt. %, more suitably at most 1.5 wt. %, most suitably at most 1 wt. %. Said water comprises any type of water, including free water, adsorbed water and crystallisation water.

In a case where the present hydrocarbon recovery composition is in the form of a powder, the number average size of the solid particles that make up such powder may vary within wide ranges. Powders may be made for example via spray-drying techniques or via so-called "nontower routes" for making compacted powders, as further discussed below. Within the present specification, a "powder" also covers "agglomerate powder" which is made by agglomerating a powder, for example by applying the above-mentioned "nontower route", as further discussed below. The number average particle size of an agglomerate powder is larger than that of the powder from which it was made. Thus, depending on the powder preparation method, the number average particle size of the powder prepared may vary to a great extent.

Conventionally, the number average particle size of powders may vary of from 25 to 5,000 micron. Also, in the present invention, the hydrocarbon recovery composition when it is in the form of a powder, may have a number average particle size from 25 to 5,000 micron, for example 200 to 1,600 micron. Suitably, such powder has a number average particle size which is at least 1 micron, more suitably at least 25 micron, more suitably at least 50 micron, more suitably at least 100 micron, most suitably at least 200 micron, and at most 10,000 micron, more suitably at most 5,000 micron, more suitably at most 3,000 micron, more suitably at most 2,000 micron, most suitably at most 1,600 micron.

In general, powders may be further characterised by flow rate and by bulk density which are relevant properties in terms of storage and handling. For example, generally, the higher the bulk density of a powder the lower the powder transport and storage costs.

Conventionally, the bulk density of powders may vary of from 100 to 1,500 gram/liter (g/l). Also, in the present invention, the hydrocarbon recovery composition when it is in the form of a powder, may have a bulk density from 100 to 1,500 g/l, for example 500 to 900 g/l. Suitably, such powder has a bulk density which is at least 50 g/l, more suitably at least 100 g/l, more suitably at least 300 g/l, more suitably at least 400 g/l, most suitably at least 500 g/l, and at most 2,000 g/l, more suitably at most 1,500 g/l, more suitably at most 1,200 g/l, more suitably at most 1,000 g/l, most suitably at most 900 g/l.

Alkaline Agent

It is preferred that, in addition to the anionic surfactant, the hydrocarbon recovery composition of the present invention comprises an alkaline agent. As mentioned above, the main function of an alkaline agent in a hydrocarbon recovery composition is to lower rock retention or adsorption.

Within the present specification, an "alkaline agent" refers to a basic, ionic salt of an alkali metal or alkaline earth metal, preferably an alkali metal, which salt is a base that dissolves in water yielding a solution having a pH greater than 7. Alkaline agents are also commonly referred to as alkalis or alkali agents.

In the preferred embodiment of the present invention where an alkaline agent is used in addition to the anionic surfactant, any alkaline agent known to the skilled person may be used.

A preferred alkaline agent that may be used in the present invention is an alkaline agent which is selected from the group consisting of alkali metal carbonate salts, alkali metal bicarbonate salts, alkali metal hydroxide salts, alkali metal silicate salts and alkali metal phosphate salts. The alkali metal counter cation in said salts may be sodium, potassium, lithium or cesium. More preferably, said counter cation is sodium or potassium, most preferably sodium.

Within the present specification, "silicate" covers orthosilicates, pyrosilicates, polysilicates and metasilicates. Preferably, the silicate is an orthosilicate, such as sodium silicate, or a metasilicate, such as sodium metasilicate.

Within the present specification, "phosphate" covers orthophosphates, pyrophosphates, polyphosphates and metaphosphates. Preferably, the phosphate is a polyphosphate. Suitable examples of polyphosphates are triphosphates and higher phosphates, such as pentasodium triphosphate.

More preferably, the alkaline agent is an alkaline agent which is selected from the group consisting of alkali metal carbonate salts, alkali metal bicarbonate salts and alkali metal hydroxide salts. Suitable examples of alkali metal hydroxide salts are sodium hydroxide and potassium hydroxide. Even more preferably, the alkaline agent is an alkali metal carbonate salt or an alkali metal bicarbonate salt. Suitable examples of alkali metal bicarbonate salts are sodium bicarbonate and potassium bicarbonate. Most preferably, the alkaline agent is an alkali metal carbonate salt, suitably sodium carbonate or potassium carbonate, more suitably sodium carbonate.

Inorganic Salt

It is preferred that, in addition to the anionic surfactant, the hydrocarbon recovery composition of the present invention comprises an inorganic salt. The inorganic salt may lower the interfacial tension between hydrocarbons to be recovered and water, as further discussed below.

Suitably, inorganic salts that may be used in the present invention are selected from the group consisting of alkali metal chlorides, alkali metal sulfates and alkali metal carbonates, wherein the alkali metal may be sodium or potassium. Specific preferred inorganic salts are selected from the group consisting of sodium chloride, potassium chloride, ammonium chloride, sodium sulfate and sodium carbonate.

Polymer

It is preferred that, in addition to the anionic surfactant, the hydrocarbon recovery composition of the present invention comprises a polymer.

As mentioned above, the main function of the polymer is to increase viscosity. That is, the polymer should be a viscosity increasing polymer. More in particular, in the present invention, the polymer should increase the viscosity of water for an aqueous fluid in which the solid hydrocarbon recovery composition of the present invention, comprising an anionic surfactant and the polymer, has been dissolved which aqueous fluid may then be injected into a hydrocarbon containing formation. For production from a hydrocarbon containing formation may be enhanced by treating the hydrocarbon containing formation with a polymer that may mobilise hydrocarbons to one or more production wells. The polymer may reduce the mobility of the water phase, because of the increased viscosity, in pores of the hydrocarbon containing formation. The reduction of water mobility may allow the hydrocarbons to be more easily mobilised through the hydrocarbon containing formation.

Suitable polymers performing the above-mentioned function of increasing viscosity in enhanced oil recovery, for use in the present invention, and preparations thereof, are described in U.S. Pat. No. 6,427,268, U.S. Pat. No. 6,439,308, U.S. Pat. No. 5,654,261, U.S. Pat. No. 5,284,206, U.S. Pat. No. 5,199,490 and U.S. Pat. No. 5,103,909, and also in "Viscosity Study of Salt Tolerant Polymers", Rashidi et al., Journal of Applied Polymer Science, volume 117, pages 1551-1557, 2010, the disclosures of all of which are incorporated herein by reference.

Suitable commercially available polymers for cEOR include Flopaam® manufactured by SNF Floerger, CIBA® ALCOFLOOD® manufactured by Ciba Specialty Additives (Tarrytown, N.Y.), Tramfloc® manufactured by Tramfloc Inc. (Temple, Ariz.) and HE® polymers manufactured by Chevron Phillips Chemical Co. (The Woodlands, Tex.). A specific suitable polymer commercially available at SNF Floerger is Flopaam® 3630 which is a partially hydrolysed polyacrylamide.

The nature of the polymer is not relevant in the present invention, as long as the polymer can increase viscosity. That is, the molecular weight of the polymer should be sufficiently high to increase viscosity. Suitably, the molecular weight of the polymer is at least 1 million Dalton, more suitably at least 2 million Dalton, most suitably at least 4 million Dalton. The maximum for the molecular weight of the polymer is not essential. Suitably, the molecular weight of the polymer is at most 30 million Dalton, more suitably at most 25 million Dalton.

Further, the polymer may be a homopolymer, a copolymer or a terpolymer. Still further, the polymer may be a synthetic polymer or a biopolymer or a derivative of a biopolymer.

Examples of suitable biopolymers or derivatives of biopolymers include xanthan gum, guar gum and carboxymethyl cellulose.

A suitable monomer for the polymer, suitably a synthetic polymer, is an ethylenically unsaturated monomer of formula $R^1R^2C=CR^3R^4$, wherein at least one of the $R^1$, $R^2$, $R^3$ and $R^4$ substituents is a substituent which contains a moiety selected from the group consisting of —C(=O)NH$_2$, —C(=O)OH, —C(=O)OR wherein R is a branched or linear $C_6$-$C_{18}$ alkyl group, —OH, pyrrolidone and —SO$_3$H (sulfonic acid), and the remaining substituent(s), if any, is (are) selected from the group consisting of hydrogen and alkyl, preferably $C_1$-$C_4$ alkyl, more preferably methyl. Most preferably, said remaining substituent(s), if any, is (are) hydrogen. Suitably, a polymer is used that is made from such ethylenically unsaturated monomer.

Suitable examples of the ethylenically unsaturated monomer as defined above, are acrylamide, acrylic acid, lauryl acrylate, vinyl alcohol, vinylpyrrolidone, and styrene sulfonic acid and 2-acrylamido-2-methylpropane sulfonic acid. Suitable examples of ethylenic homopolymers that are made from such ethylenically unsaturated monomers are polyacrylamide, polyacrylate, polylauryl acrylate, polyvinyl alcohol, polyvinylpyrrolidone, and polystyrene sulfonate and poly(2-acrylamido-2-methylpropane sulfonate). For these polymers, the counter cation for the —C(=O)O$^-$ moiety (in the case of polyacrylate) and for the sulfonate moiety may be an alkali metal cation, such as a sodium ion, or an ammonium ion.

As mentioned above, copolymers or terpolymers may also be used. Examples of suitable ethylenic copolymers include copolymers of acrylic acid and acrylamide, acrylic acid and lauryl acrylate, and lauryl acrylate and acrylamide.

Preferably, the polymer which may be used in the present invention is a polyacrylamide, more preferably a partially hydrolysed polyacrylamide. A partially hydrolysed polyacrylamide contains repeating units of both —[CH$_2$—CHC(=O)NH$_2$]— and —[CH$_2$—CHC(=O)O$^-$M$^+$]- wherein M$^+$ may be an alkali metal cation, such as a sodium ion, or an ammonium ion. The extent of hydrolysis is not essential and may vary within wide ranges. For example, 1 to 99 mole %, or 5 to 95 mole %, or 10 to 90 mole %, suitably 15 to 40 mole %, more suitably 20 to 35 mole %, of the polyacrylamide may be hydrolysed.

Combinations of Anionic Surfactant, Alkaline Agent and/or Polymer

As described above, the hydrocarbon recovery composition of the present invention should comprise an anionic surfactant. Further, the hydrocarbon recovery composition of the present invention may comprise an alkaline agent as described above. Further, it may comprise a polymer as described above. And still further, it may comprise an inorganic salt as described above.

Any combination of the anionic surfactant with the above-mentioned further compounds is envisaged in the present invention. The hydrocarbon recovery composition of the present invention may thus comprise: the anionic surfactant and an alkaline agent, or the anionic surfactant and a polymer, or the anionic surfactant and an inorganic salt, or the anionic surfactant, an alkaline agent and a polymer, or the anionic surfactant, an alkaline agent and an inorganic salt, or the anionic surfactant, a polymer and an inorganic salt, or the anionic surfactant, an alkaline agent, a polymer and an inorganic salt. Preferably, the hydrocarbon recovery composition of the present invention comprises the anionic surfactant and an alkaline agent. More preferably, the hydrocarbon recovery composition of the present invention comprises the anionic surfactant, an alkaline agent and a polymer.

In the present invention, in case an alkaline agent is used, the weight ratio of the alkaline agent to the anionic surfactant is preferably from 1:1 to 10:1, more preferably 2:1 to 8:1, more preferably 2:1 to 5:1, most preferably 3:1 to 4:1.

Further, in the present invention, in case a polymer is used, the weight ratio of the anionic surfactant to the polymer is preferably from 0.5:1 to 15:1, more preferably 0.5:1 to 10:1, more preferably 0.5:1 to 8:1, more preferably 0.5:1 to 6:1, more preferably 1:1 to 4:1, most preferably 1:1 to 3:1.

Still further, in the present invention, in case an alkaline agent and a polymer are used, the weight ratio of the alkaline agent to the polymer is preferably from 1:1 to 40:1, more preferably 1:1 to 35:1, more preferably 1:1 to 30:1, more preferably 1:1 to 25:1, more preferably 2:1 to 20:1, most preferably 3:1 to 18:1.

In general, the above-mentioned weight ratios may be fine-tuned depending on the specific conditions of a specific hydrocarbon containing formation. More specifically, the amount of polymer relative to the amount of anionic surfactant or to the amount of alkaline agent (if any) may vary within wide ranges.

Preparing the Hydrocarbon Recovery Composition

The present invention also relates to any one of the below-described processes for preparing the hydrocarbon recovery composition of the present invention.

The solid hydrocarbon recovery composition of the present invention can be prepared by any method known to the skilled person. Said solid composition can be prepared from a composition containing water and the anionic surfactant by removing water. That is, the solid hydrocarbon recovery composition of the present invention can be prepared by a process comprising providing an aqueous mixture comprising an anionic surfactant; removing water from the aqueous mixture; and recovering the solid comprising the anionic surfactant. Within the present specification, the term "mixture" is meant to cover both solutions and suspensions (that is to say dispersions).

In said process, the aqueous mixture comprising the anionic surfactant may be provided as the product mixture that results from the preparation of the anionic surfactant after neutralisation and hydrolysis as described above. Further, in said process, water removal may be effected by means of heating the aqueous mixture under such temperature and pressure conditions whereby the water is evaporated, after which the solid, which comprises the anionic surfactant, can be recovered. An evaporator that can be suitably used is a wiped-film evaporator.

In case the hydrocarbon recovery composition of the present invention also comprises an alkaline agent and/or a polymer as described above, then in said process, there may also be provided an aqueous mixture comprising the alkaline agent and/or an aqueous mixture comprising the polymer, which latter mixture(s) is or are then mixed with the aqueous mixture comprising the anionic surfactant. Alternatively, said alkaline agent and/or polymer may be added to the aqueous mixture comprising the anionic surfactant, without being part of (a) separate aqueous mixture(s).

In a case where the solid hydrocarbon recovery composition of the present invention is in the form of a powder comprising the anionic surfactant and also an alkaline agent and/or a polymer as described above, such powder can be made by any method known to the skilled person, including methods known for making powdered detergents. Suitable methods are described in "Powdered Detergents", Surfactant Science Series, volume 71, edited by M. S. Showell, 1998, Marcel Dekker Inc., more in particular in Chapter 2 thereof which is entitled "Compact Powdered Detergent Process Technologies", pages 21-42, the disclosure of which is incorporated herein by reference. Detergent powders used to be made via spray-drying techniques, but nowadays it is preferred to use dedicated mixing devices to prepare compacted detergent powders. For example, in the present invention, the "Ballestra Kettemixer" may be used for making the hydrocarbon recovery composition of the present invention in a case where that is in the form of a powder, as is demonstrated in the Examples below. Said "Ballestra Kettemixer" is normally used as a mixer in the so-called "nontower route" for making compacted detergent powders. Further reference is made to said literature reference, in particular page 36 concerning surfactant agglomeration.

A further suitable method for preparing the solid hydrocarbon recovery composition of the present invention when that is in the form of such powder, is described in U.S. Pat. No. 5,108,646, the disclosure of which is incorporated herein by reference. More in particular, the method disclosed in the passage at column 9, line 65 to column 10, line 35 of U.S. Pat. No. 5,108,646, for making an agglomerate powder from a builder and a binder, is a suitable method for preparing said solid hydrocarbon recovery composition of the present invention.

In a case where the solid hydrocarbon recovery composition of the present invention is in the form of a powder comprising the anionic surfactant and an alkaline agent as described above, such powder can be prepared by a process comprising providing an aqueous mixture comprising an anionic surfactant; mixing the aqueous mixture comprising the anionic surfactant with a powder comprising an alkaline agent; removing water from the resulting aqueous mixture comprising the anionic surfactant and alkaline agent; and recovering a powder comprising the anionic surfactant and alkaline agent.

In a case where the solid hydrocarbon recovery composition of the present invention is in the form of a powder comprising the anionic surfactant and a polymer as described above, such powder can be prepared by a process comprising providing an aqueous mixture comprising an anionic surfactant; mixing the aqueous mixture comprising the anionic surfactant with a powder comprising a polymer; removing water from the resulting aqueous mixture comprising the anionic surfactant and polymer; and recovering a powder comprising the anionic surfactant and polymer.

In a case where the solid hydrocarbon recovery composition of the present invention is in the form of a powder comprising the anionic surfactant, an alkaline agent as described above and a polymer as described above, such powder can be prepared by a process comprising providing an aqueous mixture comprising an anionic surfactant; mixing the aqueous mixture comprising the anionic surfactant with a powder comprising an alkaline agent and with a powder comprising a polymer; removing water from the resulting aqueous mixture comprising the anionic surfactant, alkaline agent and polymer; and recovering a powder comprising the anionic surfactant, alkaline agent and polymer.

In a case where the solid hydrocarbon recovery composition of the present invention is in the form of a powder comprising the anionic surfactant, an alkaline agent as described above and a polymer as described above, such powder is preferably not prepared by mixing all three components simultaneously, as in the above-mentioned process, but consecutively as further discussed below.

Preferably, such powder is prepared by a process comprising mixing a powder comprising an alkaline agent with a powder comprising a polymer; recovering a powder comprising the alkaline agent and polymer; providing an aqueous mixture comprising an anionic surfactant; mixing the powder comprising the alkaline agent and polymer with the aqueous mixture comprising the anionic surfactant; removing water from the resulting aqueous mixture comprising the anionic surfactant, alkaline agent and polymer; and recovering a powder comprising the anionic surfactant, alkaline agent and polymer.

More preferably, such powder is prepared by a process comprising providing an aqueous mixture comprising an anionic surfactant; mixing the aqueous mixture comprising the anionic surfactant with a powder comprising an alkaline agent; removing water from the resulting aqueous mixture comprising the anionic surfactant and the alkaline agent; recovering a powder comprising the anionic surfactant and alkaline agent; mixing the powder comprising the anionic surfactant and alkaline agent with a powder comprising a polymer; and recovering a powder comprising the anionic surfactant, alkaline agent and polymer.

Surprisingly, it has appeared in the below Examples that the dissolution time (in water) for a powder comprising anionic surfactant, alkaline agent and polymer is significantly shorter when it has been prepared in a process where first a powder comprising anionic surfactant and alkaline agent is prepared and only then polymer is added to that powder, as described above, as compared to a case where the powder has been prepared in a process where first a powder comprising alkaline agent and polymer is prepared after which anionic surfactant is added to that powder, as also described above.

In a case where the solid hydrocarbon recovery composition of the present invention is in the form of a powder comprising the anionic surfactant and an inorganic salt as described above, and possibly an alkaline agent as described above and/or a polymer as described above, preparation methods to obtain such powders can be applied which are similar to the above-described processes. For example, a powder comprising an inorganic salt may be mixed with an aqueous mixture comprising the anionic surfactant. Or, in case the solid hydrocarbon recovery composition of the present invention also comprises an alkaline agent and/or a polymer, a powder comprising an inorganic salt may be mixed with a powder comprising the anionic surfactant and an alkaline agent and/or a polymer wherein the latter powder may have been prepared by applying one of the above-described processes. Or, such composition may be prepared by mixing a powder comprising an inorganic salt with an aqueous mixture comprising the anionic surfactant, simultaneously with or followed by mixing with a powder comprising an alkaline agent and/or a powder comprising a polymer.

In case where in the above-mentioned processes for preparing the solid hydrocarbon recovery composition of the present invention in the form of a powder, a powder comprising an alkaline agent and/or a powder comprising a polymer and/or a powder comprising an inorganic salt is used, said alkaline agent powder, polymer powder and inorganic salt powder may have a number average particle size and bulk density within the same ranges as disclosed above in connection with the solid hydrocarbon recovery composition of the present invention when that is in the form of a powder.

In the above-mentioned processes for preparing the solid hydrocarbon recovery composition of the present invention in the form of a powder comprising the anionic surfactant and also an alkaline agent and/or a polymer and/or an inorganic salt, the aqueous mixture comprising the anionic surfactant may be provided as the product mixture that results from the preparation of the anionic surfactant after neutralisation and hydrolysis wherein partial removal of water has taken place. Preferably, the aqueous mixture to be provided comprises the anionic surfactant in an amount of from 50 to 90 wt. %, more preferably 55 to 85 wt. %, most preferably 60 to 80 wt. %, and water in an amount of from 2 to 20 wt. %, more preferably 5 to 15 wt. %, most preferably 8 to 12 wt. %.

In case where in the above-mentioned processes for preparing the solid hydrocarbon recovery composition of the present invention in the form of a powder, a powder comprising an alkaline agent is used, said alkaline agent powder may be a powder of an anhydrous alkaline agent or a powder of a hydrate of an alkaline agent. Preferably, the alkaline agent powder is a powder of an anhydrous alkaline agent. An anhydrous salt contains no crystallisation water whereas a hydrate of a salt does contain crystallisation water. For example, a suitable crystallisation water free (anhydrous) alkaline agent powder is anhydrous sodium carbonate ($Na_2CO_3.0$ aq) powder.

Surprisingly, it was found that alkaline agent powders like the above-described alkaline agent powders, especially when such powders are anhydrous, are also helpful in making the present solid hydrocarbon recovery composition comprising an anionic surfactant when the latter composition is in the form of a powder. That is to say, such alkaline agent powder is useful, surprisingly, both in making an anionic surfactant containing powder of the present invention and then, as dissolved alkaline agent, in lowering rock retention or adsorption when the latter powder is used in hydrocarbon recovery upon dissolving that powder in the fluid that is finally injected into a hydrocarbon containing formation.

Further, in the above-mentioned processes for preparing the solid hydrocarbon recovery composition of the present invention in the form of a powder comprising the anionic surfactant and also an alkaline agent and/or a polymer and/or an inorganic salt, water removal may suitably be effected by using a fluid-bed dryer, for example a vibrating fluid-bed dryer. Not necessarily all water originally present in the aqueous mixture comprising the anionic surfactant needs to be removed. Part of the water may remain behind in the powder in the form of crystallisation water and/or adsorbed water.

In addition to the above-mentioned processes for preparing the solid hydrocarbon recovery composition of the present invention in the form of a powder comprising the anionic surfactant and also an alkaline agent and/or a polymer and/or an inorganic salt, the present invention also relates to the solid hydrocarbon recovery compositions that are obtainable by applying said processes.

Shaped Article

Further, the present invention relates to a shaped article comprising the hydrocarbon recovery composition of the present invention as described above. As described above, the hydrocarbon recovery composition of the present invention comprises an anionic surfactant and it is in the solid state. For example, the way the hydrocarbon recovery composition of the present invention has been prepared may be such that a powder is generated, in which case said hydrocarbon recovery composition is in the form of a powder, as also described above.

Within the present specification, by "shaped article comprising the hydrocarbon recovery composition of the present invention" it is meant the article that is the product obtained by shaping the solid hydrocarbon recovery composition of the present invention, which latter composition may be a powder as described above. In this context, "shaping" means performing any action on that solid composition, which may be a powder, which results in a different shape of that solid composition. A common shaping method is compacting a solid product, such as a powder, into articles having specific shapes, such as tablets, pellets and granules. Before or during shaping, auxiliaries may be added, such as binders to improve the shaping process.

Still further, the present invention relates to a process for preparing a shaped article comprising a hydrocarbon recovery composition, said process comprising preparing a hydrocarbon recovery composition in accordance with any one of the processes as described above; and shaping the composition into the shaped article.

Oil Recovery: Treating a Hydrocarbon Containing Formation with the Hydrocarbon Recovery Composition Further, the present invention relates to a process for treating a hydrocarbon containing formation comprising the steps of a) transporting the hydrocarbon recovery composition or the shaped article as described above to the location of the hydrocarbon containing formation;

b) dissolving the hydrocarbon recovery composition or shaped article in water thereby forming an aqueous fluid containing the hydrocarbon recovery composition;

c) providing the aqueous fluid containing the hydrocarbon recovery composition to at least a portion of the hydrocarbon containing formation; and d) allowing the hydrocarbon recovery composition to interact with the hydrocarbons in the hydrocarbon containing formation.

In step b) of the process for treating a hydrocarbon containing formation of the present invention, dissolving in water is performed thereby forming an aqueous fluid containing the hydrocarbon recovery composition, which fluid can be injected into the hydrocarbon containing formation, that is to say an injectable fluid. The water used suitably originates from the formation from which hydrocarbons are to be recovered. Preferably, said water is brine, which is a salt (for example NaCl) containing aqueous solution.

The amount of the anionic surfactant in said injectable fluid may be of from 0.05 to 2 wt. %, preferably 0.1 to 1.5 wt. %, more preferably 0.1 to 1.0 wt. %, most preferably 0.2 to 0.5 wt. %. The amount of alkali agent (if any) as described above in said injectable fluid may be of from 0.15 to 6 wt. %, preferably 0.3 to 4.5 wt. %, more preferably 0.3 to 3.0 wt. %, most preferably 0.6 to 1.5 wt. %. The amount of polymer (if any) as described above in said injectable fluid may be of from 0.05 to 2 wt. %, preferably 0.1 to 1.5 wt. %, more preferably 0.1 to 1.0 wt. %, most preferably 0.2 to 0.5 wt. %.

In the present invention, the temperature within the hydrocarbon containing formation may be between 10° C. and 150° C., optionally between 30° C. and 90° C. Further, in the present invention, the salinity of the water originating from the hydrocarbon containing formation may be between 0.5% and 20% or between 0.5% and 10% or between 1% and 6%.

Hydrocarbons may be produced from hydrocarbon containing formations through wells penetrating such formations. "Hydrocarbons" are generally defined as molecules formed primarily of carbon and hydrogen atoms such as oil and natural gas. Hydrocarbons may also include other elements, such as halogens, metallic elements, nitrogen, oxygen and/or sulfur. Hydrocarbons derived from a hydrocarbon containing formation may include kerogen, bitumen, pyrobitumen, asphaltenes, oils or combinations thereof. Hydrocarbons may be located within or adjacent to mineral matrices within the earth. Matrices may include sedimentary rock, sands, silicilytes, carbonates, diatomites and other porous media.

A "hydrocarbon containing formation" may include one or more hydrocarbon containing layers, one or more non-hydrocarbon containing layers, an overburden and/or an underburden. An overburden and/or an underburden includes one or more different types of impermeable materials. For example, overburden/underburden may include rock, shale, mudstone, or wet/tight carbonate (that is to say an impermeable carbonate without hydrocarbons). For example, an underburden may contain shale or mudstone. In some cases, the overburden/underburden may be somewhat permeable. For example, an underburden may be composed of a permeable mineral such as sandstone or limestone. At least a portion of a hydrocarbon containing formation may exist at less than or more than 1000 feet (305 meters) below the earth's surface.

Properties of a hydrocarbon containing formation may affect how hydrocarbons flow through an underburden/overburden to one or more production wells. Properties include porosity, permeability, pore size distribution, surface area, salinity or temperature of formation. Overburden/underburden properties in combination with hydrocarbon properties, capillary pressure (static) characteristics and relative permeability (flow) characteristics may affect mobilisation of hydrocarbons through the hydrocarbon containing formation.

Fluids (for example gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. A first boundary may form between a water layer and underburden. A second boundary may form between a water layer and a hydrocarbon layer. A third boundary may form between hydrocarbons of different densities in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult.

Quantification of energy required for interactions (for example mixing) between fluids within a formation at an interface may be difficult to measure. Quantification of energy levels at an interface between fluids may be determined by generally known techniques (for example spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (for example greater than 10 dynes/cm) may indicate the inability of one fluid to mix with a second fluid to form a fluid emulsion. As used herein, an "emulsion" refers to a dispersion of one immiscible fluid into a second fluid by addition of a compound that reduces the interfacial tension between the fluids to achieve stability. The inability of the fluids to mix may be due to high surface interaction energy between the two fluids. Low interfacial tension values (for example less than 1 dyne/cm) may indicate less surface interaction between the two immiscible fluids. Less surface interaction energy between two immiscible fluids may result in the mixing of the two fluids to form an emulsion. Fluids with low interfacial tension values may be mobilised to a well bore due to reduced capillary forces and subsequently produced from a hydrocarbon containing formation.

Water in a hydrocarbon containing formation may contain minerals (for example minerals containing barium, calcium, or magnesium) and mineral salts (for example sodium chloride, potassium chloride, magnesium chloride).

Water salinity and/or water hardness of water in a formation may affect recovery of hydrocarbons in a hydrocarbon containing formation. As used herein "salinity" refers to an amount of dissolved solids in water. "Water hardness", as used herein, refers to a concentration of multivalent ions (for example calcium, magnesium) in the water. Water salinity and hardness may be determined by generally known methods (for example conductivity, titration). As used herein, "high salinity water" refers to water that has greater than 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation. Hydrocarbons and low salinity water may form a well dispersed emulsion due to a low interfacial tension between the low salinity water and the hydrocarbons. Production of a flowable emulsion (for example hydrocarbons/water mixture) from a hydrocarbon containing formation may be more economically viable to a producer. As used herein, "low salinity water" refers to water salinity in a hydrocarbon containing formation that is less than 20,000 ppm total dissolved solids based on sodium chloride. Hydrocarbon containing formations may include water with a salinity of less than 13,000 ppm.

Initially, natural formation pressure and temperature in a hydrocarbon containing formation may be sufficient to cause hydrocarbons to flow into well bores and out to the surface. As hydrocarbons are produced from a hydrocarbon containing formation, pressures and/or temperatures within the formation may decline. Various forms of artificial lift (for example pumps, gas injection) and/or heating may be employed to continue to produce hydrocarbons from the hydrocarbon containing formation.

Mobilisation of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. Capillary forces may be overcome by increasing the pressures within a hydrocarbon containing formation.

Capillary forces may also be overcome by reducing the interfacial tension between fluids in a hydrocarbon containing formation. The ability to reduce the capillary forces in a hydrocarbon containing formation may depend on a number of factors, including the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (for example brine, steam), gases, polymers, monomers or any combinations thereof to the hydrocarbon containing formation to increase mobilisation of hydrocarbons.

A hydrocarbon containing formation may thus also be treated with the hydrocarbon recovery composition of the present invention, comprising an anionic surfactant, as described above. Interaction of said hydrocarbon recovery composition with the hydrocarbons may reduce the interfacial tension of the hydrocarbons with one or more fluids in the hydrocarbon containing formation. The interfacial tension between the hydrocarbons and an overburden/underburden of a hydrocarbon containing formation may be reduced. Reduction of the interfacial tension may allow at least a portion of the hydrocarbons to mobilise through the hydrocarbon containing formation.

The ability of the hydrocarbon recovery composition of the present invention, comprising an anionic surfactant, to reduce the interfacial tension of a mixture of hydrocarbons and fluids may be evaluated using known techniques. The interfacial tension value for a mixture of hydrocarbons and water may be determined using a spinning drop tensiometer. An amount of an aqueous solution comprising the solid hydrocarbon recovery composition of the present invention may be added to the hydrocarbon/water mixture and the interfacial tension value for the resulting fluid may be determined.

An aqueous fluid comprising the solid hydrocarbon recovery composition of the present invention may be provided (for example injected) into hydrocarbon containing formation 100 through injection well 110 as depicted in FIG. 2. Hydrocarbon containing formation 100 may include overburden 120, hydrocarbon layer 130, and underburden 140. Injection well 110 may include openings 112 that allow fluids to flow through hydrocarbon containing formation 100 at various depth levels. Hydrocarbon layer 130 may be less than 1000 feet (305 meters) below earth's surface. Low salinity water may be present in hydrocarbon containing formation 100.

The hydrocarbon recovery composition of the present invention may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (for example water, hydrocarbons) in the formation and the underburden 140, one or more fluids in the formation and the overburden 120 or combinations thereof.

The hydrocarbon recovery composition of the present invention may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. The interfacial tension value between the hydrocarbons and one or more other fluids may be altered by the hydrocarbon recovery composition to a value of less than 0.1 dyne/cm or less than 0.05 dyne/cm or less than 0.001 dyne/cm.

At least a portion of the hydrocarbon recovery composition/hydrocarbon/fluids mixture may be mobilised to production well 150. Products obtained from the production well 150 may include components of the hydrocarbon recovery composition, methane, carbon monoxide, water, hydrocarbons, ammonia, asphaltenes or combinations thereof. Hydrocarbon production from hydrocarbon containing formation 100 may be increased by greater than 50% after the present hydrocarbon recovery composition has been added to a hydrocarbon containing formation.

Figure 3:
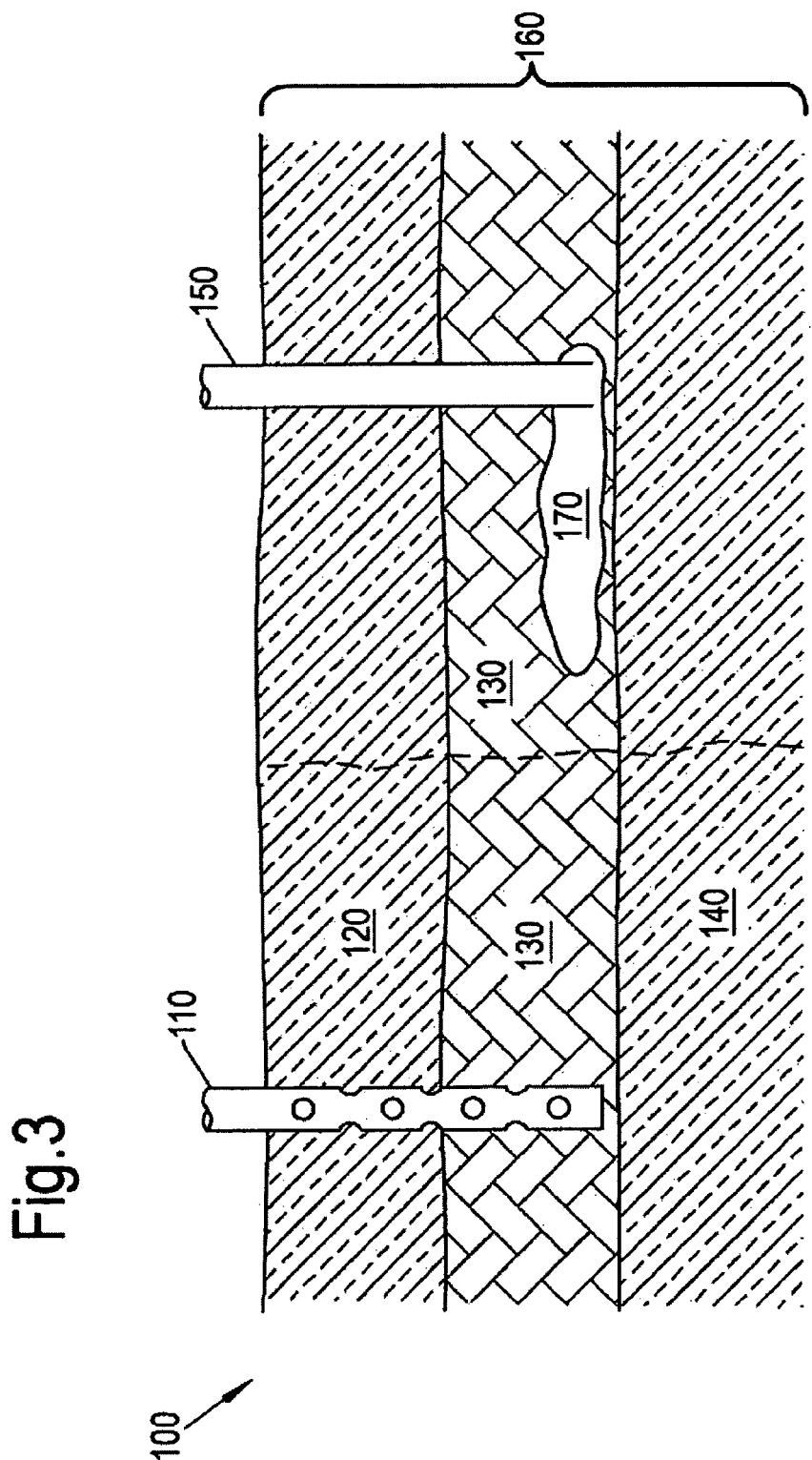
FIG. 3 schematically illustrates providing a hydrocarbon recovery composition to a hydrocarbon containing formation.

An aqueous fluid, wherein the hydrocarbon recovery composition of the present invention is dissolved, may also be injected into hydrocarbon containing formation 100 through injection well 110 as depicted in FIG. 3. Interaction of the hydrocarbon recovery composition with hydrocarbons in the formation may reduce at least a portion of the interfacial tension between the hydrocarbons and underburden 140. Reduction of at least a portion of the interfacial tension may mobilise at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

It may be beneficial under certain circumstances that an aqueous fluid, wherein the hydrocarbon recovery composition of the present invention is dissolved, contains an inorganic salt, such as sodium chloride, potassium chloride, ammonium chloride, sodium sulfate or sodium carbonate. Such inorganic salt may be added separately from the hydrocarbon recovery composition of the present invention or, as discussed above, it may be included in the hydrocarbon recovery composition of the present invention before it is dissolved in water. The addition of the inorganic salt may help the fluid disperse throughout a hydrocarbon/water mixture. This enhanced dispersion may decrease the interactions between the hydrocarbon and water interface. The decreased interaction may lower the interfacial tension of the mixture and provide a fluid that is more mobile.

The invention is further illustrated by the following Examples.

EXAMPLES

1. Chemicals Used in the Examples

In the Examples, powders were prepared which comprised an anionic surfactant and an alkaline agent and, in some cases, a polymer.

1.1 Anionic Surfactant

In the Examples, the anionic surfactant used was an internal olefin sulfonate (IOS). This surfactant is hereinafter also abbreviated as S. The IOS was used in the form of an IOS containing aqueous mixture. Various IOS were used in the Examples: C15-C18 IOS, C19-C23 IOS, C20-C24 IOS and C24-C28 IOS.

The IOS 20-24 (or C20-C24 IOS) surfactant originated from a mixture of C20-24 internal olefins which was a mixture of only even carbon number olefins and had an average carbon number of about 20.6. Less than 3% of the total internal olefins were C18 and lower internal olefins, 70% were C20, 22% were C22, 4% were C24 and less than 1% were C26 and higher. 96% of the internal olefins had from 20 to 24 carbon atoms.

The IOS 15-18 (or C15-C18 IOS) surfactant originated from a mixture of C15-18 internal olefins which was a mixture of odd and even carbon number olefins and had an average carbon number of about 16.6. The C14 and lower olefin was 1% of the total, C15 was 20%, C16 was 27%, C17 was 26%, C18 was 21% and C19 and higher was less than 6%. 94% of the internal olefins had from 15 to 18 carbon atoms.

The IOS 19-23 (or C19-C23 IOS) surfactant originated from a mixture of C19-C23 internal olefins which was a mixture of odd and even carbon number olefins and had an average carbon number of about 21.1. Less than 13.4% of the total internal olefins were C18 and lower internal olefins, 10.5% were C19, 15.1% were C20, 15.4% were C21, 13.7% were C22, 10.5% were C23 and less than 21.4% were C24 and higher. 65% of the internal olefins had from 19 to 23 carbon atoms.

The IOS 24-28 (or C24-C28 IOS) surfactant originated from a mixture of C24-C28 internal olefins which was a mixture of odd and even carbon number olefins and had an average carbon number of about 27.0. Less than 14.9% of the total internal olefins were C23 and lower internal olefins, 7.6% were C24, 9.0% were C25, 10.2% were C26, 10.4% were C27, 9.8% were C28 and less than 38.1% were C29 and higher. 47% of the internal olefins had from 20 to 24 carbon atoms.

All of said four anionic surfactants were sodium salts. Further properties are mentioned in the table below.

|  | IOS 20-24 | IOS 15-18 | IOS 19-23 | IOS 24-28 |
|---|---|---|---|---|
| Properties of olefins used in IOS preparation | | | | |
| Weight average carbon number | 20.6 | 16.6 | 21.1 | 27.0 |
| Weight average number of branches | n.d. | n.d. | 0.9 | 2.4 |
| Weight ratio linear:branched | 91:9 | 94:6 | 77:23 | 80:20 |
| Weight average molecular weight (g/mole) | 287 | 232 | 295 | 378 |
| Composition of IOS | | | | |
| Hydroxyalkane sulfonate (%) | 77 | 81 | 65 | 43 |
| Alkene sulfonate (%) | 21 | 18 | 33 | 56 |
| Di-sulfonate (%) | 2 | <1 | 2 | 1 |
| Composition of IOS containing aqueous mixture | | | | |
| IOS (wt. %)[1] | 70.7 | 77.5 | 65.8 | 64.4 |
| Water (wt. %)[1] | 10 | 10 | 10 | 10 |
| Free oil (wt. %)[2] | 8.1 | 4.9 | 11.1 | 16.9 |
| NEODOL ™ 91-8[2] | 5 | 5 | 5 | 5 |
| Na$_2$SO$_4$ (wt. %)[2] | 2.4 | 2.8 | 8.1 | 9.8 | n.d. = not determined
[1]Relative to total composition.
[2]Relative to IOS.

1.2 Alkaline Agent

In the Examples, crystallisation water free (anhydrous) sodium carbonate powder (Na$_2$CO$_3$.0 aq) was used as an alkaline agent. This compound is hereinafter also abbreviated as A. The powder used is commercially available as "Soda Ash Light" from Solvay Chemicals.

1.3 Polymer

In the Examples, in some cases, a polymer was used, namely Flopaam™ 3630 powder which is commercially available at SNF Floerger. This compound is a polyacrylamide which is partially (25-30 mole %) hydrolysed and which has an approximate molecular weight of 20 million Dalton. This compound is hereinafter also abbreviated as P.

2. Powder Properties

The following properties of the powders prepared in the Examples were measured:

"% H$_2$O": this refers to the water content (weight percentage) in the powder. As a method for measuring said water content, a Karl Fischer method was used.

"Bulk density": this refers to the weight of a known volume of the powder, and is expressed in units of grams per 1 liter of powder (g/l).

"Dynamic flow rate" (DFR): this refers to the flow behaviour of the powder, and is expressed in qualitative terms: "bad" (relatively low DFR), "moderate" or "good" (relatively high DFR).

3. Examples 1-31: Powder Preparation (Batchwise and Labscale)

In Examples 1-31, various IOS were used, namely C15-C18 IOS, C19-C23 IOS, C20-C24 IOS and C24-C28 IOS, in addition to the sodium carbonate alkaline agent.

Further, for each of said 4 surfactants, AS powders (surfactant and alkaline agent, but no polymer) and ASP powders (surfactant, alkaline agent and polymer) were prepared.

Further, for each of said AS and ASP powders, the weight ratios A:S and A:S:P, respectively, were varied.

The powders were prepared in a batch process and on labscale (400 gram scale).

In Examples 1-29, the AS powders were prepared by charging a labscale mixer with sodium carbonate powder and then starting the mixer. The IOS containing aqueous mixture having a temperature of about 80° C. was then added to the mixer while mixing. Mixing was then continued for about 5 minutes after which the blend in the mixer was transferred to a dish which was then placed in an oven at 105° C. for 20 hours. After the obtained powder was cooled down to room temperature, powder properties were determined.

Where in Examples 1-29 ASP powders were also prepared, these were prepared by charging a labscale mixer with the AS powder as prepared in the above way and then starting the mixer. The polymer powder was then added to the mixer while mixing. Mixing was then continued for about 5 minutes after which the blend in the mixer was transferred to a dish which was then placed in an oven at 105° C. for 20 hours. After the powder was cooled down to room temperature, powder properties were determined.

Further data and powder properties are mentioned in Tables 1-6.

TABLE 1

AS powders wherein S = C15-C18 IOS

| Example | 1 | 2 | 3 | 4 |
|---|---|---|---|---|
| weight ratio A:S | 6:1 | 5:1 | 4:1 | 3:1 |
| % H$_2$O | 1.38 | 1.72 | 1.45 | 1.13 |
| bulk density | 707 | 683 | 713 | 699 |
| dynamic flow rate | good | moderate | moderate | moderate |

TABLE 2

ASP powders wherein S = C15-C18 IOS

| | Example | | | | | | |
|---|---|---|---|---|---|---|---|
| | 5 | 6 | 7 | 8 | 9 | 10 | 11 |
| AS powder | Ex. 3 | Ex. 3 | Ex. 4 | Ex. 4 | Ex. 2 | Ex. 2 | Ex. 1 |
| weight ratio A:S:P | 12:3:1 | 4:1:1 | 9:3:1 | 3:1:1 | 15:3:1 | 5:1:1 | 18:3:1 |
| % $H_2O$ | 1.91 | 2.70 | 1.86 | 2.96 | 2.02 | 2.73 | 1.16 |
| bulk density | 701 | 672 | 667 | 576 | 742 | 665 | 729 |
| dynamic flow rate | moderate | moderate | moderate | moderate | moderate | moderate | good |

TABLE 3

AS and ASP powders wherein S = C20-C24 IOS

| Example | 12 | 13 | 14 | 15 | 16 |
|---|---|---|---|---|---|
| AS powder | n.a. | n.a. | Ex. 12 | Ex. 13 | Ex. 13 |
| weight ratio A:S:P | 4:1:0 | 3:1:0 | 12:3:1 | 9:3:1 | 3:1:1 |
| % $H_2O$ | 3.31 | 3.72 | 3.76 | 4.09 | 4.47 |
| bulk density | 667 | 646 | 667 | 603 | 556 |
| dynamic flow rate | good | good | good | moderate | moderate | n.a. = not applicable

TABLE 4

AS and ASP powders wherein S = C24-C28 IOS

| Example | 17 | 18 | 19 | 20 | 21 |
|---|---|---|---|---|---|
| AS powder | n.a. | n.a. | Ex. 17 | Ex. 18 | Ex. 18 |
| weight ratio A:S:P | 4:1:0 | 3:1:0 | 12:3:1 | 9:3:1 | 3:1:1 |
| % $H_2O$ | 3.07 | 3.26 | 3.57 | 3.99 | 4.47 |
| bulk density | 744 | 676 | 747 | 630 | 562 |
| dynamic flow rate | good | good | good | moderate | moderate | n.a. = not applicable

TABLE 5

AS powders wherein S = C19-C23 IOS

| Example | 22 | 23 | 24 | 25 |
|---|---|---|---|---|
| weight ratio A:S | 6:1 | 5:1 | 4:1 | 3:1 |
| % $H_2O$ | n.d. | n.d. | n.d. | 2.13 |
| bulk density | n.d. | n.d. | n.d. | 620 |
| dynamic flow rate | n.d. | n.d. | n.d. | n.d. | n.d. = not determined

TABLE 6

ASP powders wherein S = C19-C23 IOS

| Example | 26 | 27 | 28 | 29 |
|---|---|---|---|---|
| AS powder | Ex. 24 | Ex. 24 | Ex. 25 | Ex. 25 |
| weight ratio A:S:P | 12:3:1 | 4:1:1 | 9:3:1 | 3:1:1 |
| % $H_2O$ | 2.15 | 2.82 | 2.95 | 3.83 |
| bulk density | 652 | 657 | 620 | 580 |
| dynamic flow rate | good | good | moderate | moderate |

Examples 1-29 show that powders in accordance with the present invention can be made by mixing an alkaline agent powder, such as $Na_2CO_3$, with an anionic surfactant containing aqueous mixture, followed by drying.

Further, said Examples show that powders in accordance with the present invention, also containing polymer in addition to an anionic surfactant and alkaline agent, can be made by mixing the polymer with a powder containing the anionic surfactant and alkaline agent, followed by drying.

Still further, the powders prepared in all of said Examples 1-29 advantageously have acceptable properties in terms of bulk density and flow behaviour.

The following Examples 30-31 show that the order of addition is not essential in terms of making a powder as such. More in particular, they demonstrate that powders containing anionic surfactant, alkaline agent and polymer can also be made by mixing an anionic surfactant containing aqueous mixture with a powder containing the alkaline agent and the polymer, followed by drying.

In Examples 30 and 31, AP powders were prepared by charging a labscale mixer with sodium carbonate powder and polymer powder and then starting the mixer. Mixing was then continued for about 5 minutes after which the IOS containing aqueous mixture having a temperature of about 80° C. was added to the mixer while mixing. Mixing was then continued for about 5 minutes after which the blend in the mixer was transferred to a dish which was then placed in an oven at 105° C. for 20 hours. After the obtained powder was cooled down to room temperature, powder properties were determined.

TABLE 7

ASP powders wherein S = C19-C23 IOS

| Example | 30 | 31 |
|---|---|---|
| weight ratio A:S:P | 9:3:1 | 3:1:1 |
| bulk density | 597 | 620 |
| dynamic flow rate | moderate | moderate |

4. Examples 32-43: Powder Preparation
(Semi-Continuous and Pilot Plant Scale)

In Examples 32-43, the powders were prepared in a semi-continuous process and on pilot plant scale. A continuously operated mixer was used in making the powders, as opposed to Examples 1-31 wherein the powders were made in a process that was completely a batch process. Said continuously operated mixer was the "Desmet Ballestra Kettemix Reactor for Detergent Agglomeration", which is commercially available at Desmet Ballestra, hereinafter referred to as the "Kettemix blender". The Kettemix blender falls in the category of "Non Tower Detergent" production technology and has originally been developed as an alternative to "(Tower) Spray Drying".

The IOS used in Examples 32-43 was C19-C23 IOS.

Further, AS powders (surfactant and alkaline agent, but no polymer) and ASP powders (surfactant, alkaline agent and polymer) were prepared.

Further, for each of said AS and ASP powders, the weight ratios A:S and A:S:P, respectively, were varied.

More specifically, the powder production plant that was used to make the powders comprised in all cases:

a) dosing facilities for addition of solid and liquid starting materials;
b) the above-mentioned Kettemix blender; and
c) a vibrating fluid-bed dryer.

The liquid fed to the Kettemix blender was the IOS containing aqueous mixture having a temperature of 67° C.

In the Kettemix blender, a solid and said liquid were combined. Due to the specific design of said blender, agglomeration of the fine particles to larger particles occurred. The product coming out of the Kettemix blender was fed to the vibrating fluid-bed dryer. In said dryer, the product was dried by contact with hot air. The powder product leaving said dryer had a temperature of about 70° C. and was collected as such in an open tray and left therein to cool down to ambient temperature. The cooled powder was then sieved (sieve size: 5 mm) to obtain a sieved powder from which the larger particles had been removed.

Three runs (Run 1, 2 and 3) were carried out: before each run, the Kettemix blender and the vibrating fluid-bed dryer were cleaned.

In Run 1 (Examples 32-37), sodium carbonate powder was continuously fed to the Kettemix blender at a flow rate of 150 kg/hour. Simultaneously, the IOS containing liquid was continuously fed to the Kettemix blender at a certain flow rate. The mixing intensity in the Kettemix blender was 1,000 rpm. Initially, the weight ratio A:S was set at 4:1, and thereafter at 3:1. The dried and sieved AS powder was then used for making ASP powders by mixing it with polymer powder in varying weight ratios, in a batch process using a Ploughshare™ type of blender, which is commercially available at Lödige, hereinafter referred to as the "Ploughshare blender". Further data and powder properties for Run 1 are mentioned in Table 8.

TABLE 8

AS and ASP powders wherein S = C19-C23 IOS (Run 1)

| | Example | | | | | |
|---|---|---|---|---|---|---|
| | 32 | 33 | 34 | 35 | 36 | 37 |
| weight ratio A:S:P | 4:1:0 | 4:1:1 | 12:3:1 | 3:1:0 | 3:1:1 | 9:3:1 |
| bulk density | 665 | 686 | 698 | 593 | 621 | 625 |
| dynamic flow rate | moderate | moderate | moderate | good | good | good | n.d. = not determined

In Run 2 (Examples 38-40), first sodium carbonate powder and polymer powder were mixed in a weight ratio of 3:1, in a batch process using the above-mentioned Ploughshare blender. The thus obtained AP powder was continuously fed to the Kettemix blender at a flow rate of 150 kg/hour. Simultaneously, the IOS containing liquid was continuously fed to the Kettemix blender at a certain flow rate. The mixing intensity in the Kettemix blender was 1,000 rpm. Further data and powder properties for Run 2 are mentioned in Table 9.

TABLE 9

ASP powders wherein S = C19-C23 IOS (Run 2)

| Example | 38 | 39 | 40 |
|---|---|---|---|
| weight ratio A:S:P | 3:0.75:1 | 3:0.85:1 | 3:1:1 |
| bulk density | 570 | 590 | n.d. |
| dynamic flow rate | good | good | n.d. | n.d. = not determined

In Run 3 (Examples 41-43), the procedure of Run 2 was repeated, except that the A:P weight ratio was 9:1 instead of 3:1.

TABLE 10

ASP powders wherein S = C19-C23 IOS (Run 3)

| Example | 41 | 42 | 43 |
|---|---|---|---|
| weight ratio A:S:P | 9:2.25:1 | 9:2.60:1 | 9:3:1 |
| bulk density | 610 | 625 | n.d. |
| dynamic flow rate | good | good | n.d. | n.d. = not determined

5. Examples 44-55: Powder Dissolution

In Examples 44-55, it is assessed whether the powders as prepared in Examples 32-43, comprising an anionic surfactant and an alkaline agent and, in some cases, a polymer, can be dissolved in water in order to be able to provide, for example at the location of a hydrocarbon containing formation, a single-phase aqueous solution containing the surfactant which solution could then be injected into said hydrocarbon containing formation. This means that the surfactant should be completely dissolved thereby obtaining a single-phase solution.

In Examples 44-55, the amount of time necessary for the powder as prepared in any one of Examples 32-43 to dissolve in an aqueous solution containing 1 wt. % of NaCl was measured. The amount of powder added to said solution was 1 wt. % (based on the weight of the solution). The dissolution time was determined when the solution became clear and the last un-dissolved powder portion disappeared. These solubility tests were performed at temperatures of 40° C., 30° C. and 25° C., at a stir rate of 400 rpm using a magnetic stir bar in a capped glass jar.

Table 11 lists the weight ratio of the components from the various powders tested, as well as the dissolution times (in minutes) at the above-specified test temperatures.

TABLE 11

| | | | Dissolution times | | |
|---|---|---|---|---|---|
| Example | Powder prepared in | Weight ratio A:S:P | Time (min.) at 25° C. | Time (min.) at 30° C. | Time (min.) at 40° C. |
| 44 | Ex. 32 | 4:1:0 | 68 | 25 | 15 |
| 45 | Ex. 35 | 3:1:0 | 50 | 36 | 8 |
| 46 | Ex. 38 | 3:0.75:1 | 40 | 25 | 9 |
| 47 | Ex. 39 | 3:0.85:1 | 47 | 33 | 12 |
| 48 | Ex. 40 | 3:1:1 | 95 | 68 | 46 |
| 49 | Ex. 41 | 9:2.25:1 | 32 | 23 | 9 |
| 50 | Ex. 42 | 9:2.6:1 | 50 | 40 | 18 |

TABLE 11-continued

Dissolution times

| Example | Powder prepared in | Weight ratio A:S:P | Time (min.) at 25° C. | Time (min.) at 30° C. | Time (min.) at 40° C. |
|---|---|---|---|---|---|
| 51 | Ex. 43 | 9:3:1 | 110 | 78 | 47 |
| 52 | Ex. 33 | 4:1:1 | 47 | 26 | 14 |
| 53 | Ex. 36 | 3:1:1 | 44 | 31 | 11 |
| 54 | Ex. 34 | 12:3:1 | 54 | 37 | 23 |
| 55 | Ex. 37 | 9:3:1 | 37 | 21 | 24 |

The results in Table 11 show that powders containing an anionic surfactant in accordance with the present invention can be completely dissolved in water, which may contain salt such as sodium chloride, thereby obtaining a single-phase solution which could then be injected into a hydrocarbon containing formation. The dissolution time is short and is within practical limits of commercial operation. The dissolution time for ASP powders in accordance with the present invention is considered especially short (see results for Examples 46-55 in Table 11) if compared to when polymer is dissolved as a single component (see result for Comparison Example 1 below).

Further, the results in Table 11 show that in cases where powders containing an anionic surfactant (S) in accordance with the present invention also contain an alkaline agent (A) and a polymer (P), the way of preparing such ASP powder has an influence on the dissolution time in water. For example, the powders prepared in Examples 40 and 43 were prepared by first preparing an AP powder and then adding S thereto. On the other hand, the powders prepared in Examples 36 and 37 were prepared by first preparing an AS powder and then adding P thereto. Upon comparing the dissolution results in Table 11 for the ASP powders prepared in Examples 40 and 36 (A:S:P weight ratio of 3:1:1) and for the ASP powders prepared in Examples 43 and 37 (A:S:P weight ratio of 9:1:1), it appears that the dissolution time is substantially shorter for the case where first an AS powder is prepared than for the case where first an AP powder is prepared.

6. Examples 56-60 and Comparison Examples 1-3: Powder Dissolution

In Examples 56-60, powder dissolution experiments were carried out similar to those of Examples 44-55. That is, in Examples 56-60, the amount of time necessary for the powder in question to dissolve in an aqueous solution containing 1 wt. % of NaCl (hereinafter also referred to as the "brine") was measured. The amount of powder added to said solution was, however, varied. The dissolution time was determined when the solution became clear and the last un-dissolved powder portion disappeared. These solubility tests were performed only at room temperature (25° C.), at a stir rate of 400 rpm using a magnetic stir bar in a capped glass jar.

In Comparison Example 1, a similar dissolution experiment was carried out as described above, with the proviso that only the polymer powder was dissolved, that is to say a powder containing the polymer but not containing an alkaline agent and neither an anionic surfactant.

In Comparison Example 2, first 0.90 wt. % of sodium carbonate powder (alkaline agent) and 0.23 wt. % of C19-C23 IOS (anionic surfactant) were dissolved in said brine. That is to say, the weight ratio A:S was about 4:1. After said dissolution, the polymer powder was added and the polymer dissolution time was determined in the same way as described above.

Comparison Example 3 was carried out in the same way as Comparison Example 2, with the proviso that 2.74 wt. % of sodium carbonate powder and 0.47 wt. % of C19-C23 IOS were dissolved. That is to say, the weight ratio A:S was about 6:1.

Further data, as well as the dissolution times, for Examples 56-60 and Comparison Examples 1-3 are listed in Table 12.

TABLE 12

Dissolution times

| Example | A:S powder prepared in | Weight ratio A:S:P | Amount of A:S:P powder (wt. %)[1] | Amount of polymer (wt. %)[1] | Time at 25° C. |
|---|---|---|---|---|---|
| 56 | Ex. 35 | 3:1:0 | 4.00 | 0 | 58 min. |
| 57 | Ex. 38 | 3:0.75:1 | 5.72 | 1.2 | 111 min. |
| 58 | Ex. 41 | 9:2.25:1 | 15.00 | 1.2 | 132 min. |
| 59 | Ex. 38 | 3:0.75:1 | 1.43 | 0.3 | 45 min. |
| 60 | Ex. 41 | 9:2.25:1 | 3.75 | 0.3 | 42 min. |
| Comp. 1 | none | n.a. | none | 0.3 | 9 h. |
| Comp. 2 | none | n.a. | none | 0.3 | 23 h. 57 min. |
| Comp. 3 | none | n.a. | none | 0.3 | 38 h. 36 m. |

[1]Weight percentage is based on the weight of the solution.
n.a. = not applicable Just like the results in Table 11 for Examples 44-55, the results for Examples 56-60 in Table 12 show that powders containing an anionic surfactant in accordance with the present invention can be completely dissolved in water, which may contain salt such as sodium chloride, thereby obtaining a single-phase solution which could then be injected into a hydrocarbon containing formation. Also the dissolution time is short and is within practical limits of commercial operation.

In addition, surprisingly, upon comparing the results for Examples 59 and 60 with the result for Comparison Example 1, in all of which cases 0.3 wt. % of polymer was used, it appears that dissolution was much faster when the polymer, before dissolution, was first included in the powder containing an anionic surfactant in accordance with the present invention, yielding a dissolution time of only 45 minutes and 42 minutes, respectively. In Comparison Example 1, however, dissolving the polymer powder took 9 hours.

Even when the polymer amount was increased up to 1.2 wt. % as in Examples 57 and 58, the dissolution times in said Examples was still much shorter than the dissolution time in Comparison Example 1, namely 111 and 132 minutes, respectively.

Such short dissolution times are even more surprising if one realises that the total amount of material, including alkaline agent, anionic surfactant and polymer, to be dissolved in all of Examples 57-60 was greater than that in Comparison Example 1.

Further, it surprisingly appears that where the brine wherein the polymer powder is to be dissolved already contains dissolved alkaline agent and dissolved anionic surfactant, like in Comparison Examples 2 and 3, the polymer dissolution time was extended even further, up to about 24 hours and about 39 hours, respectively, as compared with Examples 57-60. A further advantage associated with said Examples 57-60 is that in the latter examples, there was only one dissolution step, whereas in Comparison Examples 2 and 3 there were two dissolution steps.

What is claimed is:

1. A process for treating a hydrocarbon containing formation comprising the steps of:
   a. preparing a hydrocarbon recovery composition by providing an aqueous mixture comprising an anionic surfactant; mixing the aqueous mixture comprising the anionic surfactant with a powder comprising an alkaline agent; removing water from the resulting aqueous mixture comprising the anionic surfactant and the alkaline agent; recovering a powder comprising the anionic surfactant and alkaline agent; mixing the powder comprising the anionic surfactant and alkaline agent with a powder comprising the polymer; and recovering a powder comprising the anionic surfactant, alkaline agent and polymer; wherein the ratio of anionic surfactant to alkaline agent to polymer in the hydrocarbon recovery composition is 3:1:1 or 9:3:1;
   b. transporting the hydrocarbon recovery composition which comprises the anionic surfactant, the alkaline agent and the polymer, wherein the anionic surfactant is an internal olefin sulfonate (IOS), the alkaline agent is selected from the group consisting of alkali metal carbonate salts, alkali metal bicarbonate salts and alkali metal hydroxide salts, the molecular weight of the polymer is at least 1 million Dalton, and the polymer is made from an ethylenically unsaturated monomer of formula $R^1R^2C=CR^3R^4$, wherein at least one of the $R^1$, $R^2$, $R^3$ and $R^4$ substituents is a substituent which contains a moiety selected from the group consisting of —C(=O)NH$_2$, —C(=O)OH, —C(=O)OR wherein R is a branched or linear $C_6$-$C_{18}$ alkyl group, —OH, pyrrolidone and —SO$_3$H, and the remaining substituent(s), if any, is selected from the group consisting of hydrogen and alkyl to the location of the hydrocarbon containing formation;
   c. dissolving the hydrocarbon recovery composition in water thereby forming an aqueous fluid containing the hydrocarbon recovery composition;
   d. providing the aqueous fluid containing the hydrocarbon recovery composition to at least a portion of the hydrocarbon containing formation; and
   e. allowing the hydrocarbon recovery composition to interact with the hydrocarbons in the hydrocarbon containing formation.

* * * * *